(12) United States Patent
Na

(10) Patent No.: US 12,287,963 B2
(45) Date of Patent: Apr. 29, 2025

(54) INPUT DEVICE COMPRISING TOUCHSCREEN, AND OPERATION METHOD OF SAME

(71) Applicant: Samsung Electronics Co., Ltd., Suwon-si (KR)

(72) Inventor: Suhyun Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 18/324,275

(22) Filed: May 26, 2023

(65) Prior Publication Data

US 2023/0297231 A1 Sep. 21, 2023

Related U.S. Application Data

(63) Continuation of application No. PCT/KR2021/014815, filed on Oct. 21, 2021.

(30) Foreign Application Priority Data

Dec. 17, 2020 (KR) .................. 10-2020-0177096

(51) Int. Cl.
*G06F 3/045* (2006.01)
*G06F 3/023* (2006.01)
(Continued)

(52) U.S. Cl.
CPC ........ *G06F 3/04886* (2013.01); *G06F 3/0236* (2013.01); *G06F 3/0482* (2013.01); *G06F 3/04895* (2013.01)

(58) Field of Classification Search
CPC .... G06F 1/1616; G06F 1/1662; G06F 1/1692; G06F 3/0219; G06F 3/023; G06F 3/0236;
(Continued)

(56) References Cited

U.S. PATENT DOCUMENTS

2015/0089428 A1 3/2015 Grieves et al.
2016/0048326 A1* 2/2016 Kim ..................... G06F 3/0488
715/773
(Continued)

FOREIGN PATENT DOCUMENTS

CN 111104078 A 5/2020
KR 20040064310 A 7/2004
(Continued)

OTHER PUBLICATIONS

International Search Report for PCT/KR2021/014815 mailed Jan. 21, 2022, 6 pages.
(Continued)

*Primary Examiner* — Insa Sadio
(74) *Attorney, Agent, or Firm* — Nixon & Vanderhye, P.C.

(57) ABSTRACT

An example embodiment electronic device may include a display, a touchscreen, a keyboard-type input device including a plurality of keys, and a processor. The processor may be configured to receive a first input of a designated toggle key included in the keyboard-type input device; receive a user input by means of the keyboard-type input device, after receiving the first input of the toggle key; display text corresponding to the user input on each of the touchscreen and the display; display content, associated with the text, on the touchscreen based on a selected interaction function; receive a first touch input at the position at which the content is displayed on the touchscreen; and, based on the first touch input, stop displaying the text displayed on the display, and display the content on the display.

15 Claims, 47 Drawing Sheets

(51) Int. Cl.
　　　*G06F 3/0482*　　(2013.01)
　　　*G06F 3/04886*　　(2022.01)
　　　*G06F 3/04895*　　(2022.01)

(58) Field of Classification Search
　　　CPC .... G06F 3/0481; G06F 3/0482; G06F 3/0486;
　　　　　　　G06F 3/04886; G06F 3/04895; G06Q
　　　　　　　　　　　　　　　　　　　　　　50/10
　　　See application file for complete search history.

(56) References Cited

U.S. PATENT DOCUMENTS

| | | |
|---|---|---|
| 2017/0010771 A1 | 1/2017 | Bernstein et al. |
| 2018/0284968 A1 | 10/2018 | Hsieh et al. |
| 2019/0056832 A1 | 2/2019 | Ligtenberg et al. |
| 2019/0361543 A1 | 11/2019 | Zhang |
| 2020/0034017 A1 | 1/2020 | Lin et al. |
| 2020/0133348 A1 | 4/2020 | Lin et al. |
| 2020/0133475 A1 | 4/2020 | Yeh et al. |

FOREIGN PATENT DOCUMENTS

| | | |
|---|---|---|
| KR | 20080087258 A | 10/2008 |
| KR | 20160021524 A | 2/2016 |
| KR | 20160060110 A | 5/2016 |
| KR | 101982081 B1 | 8/2019 |
| KR | 102074764 B1 | 2/2020 |

OTHER PUBLICATIONS

Written Opinion of the ISA for PCT/KR2021/014815 mailed Jan. 21, 2022, 5 pages.

\* cited by examiner

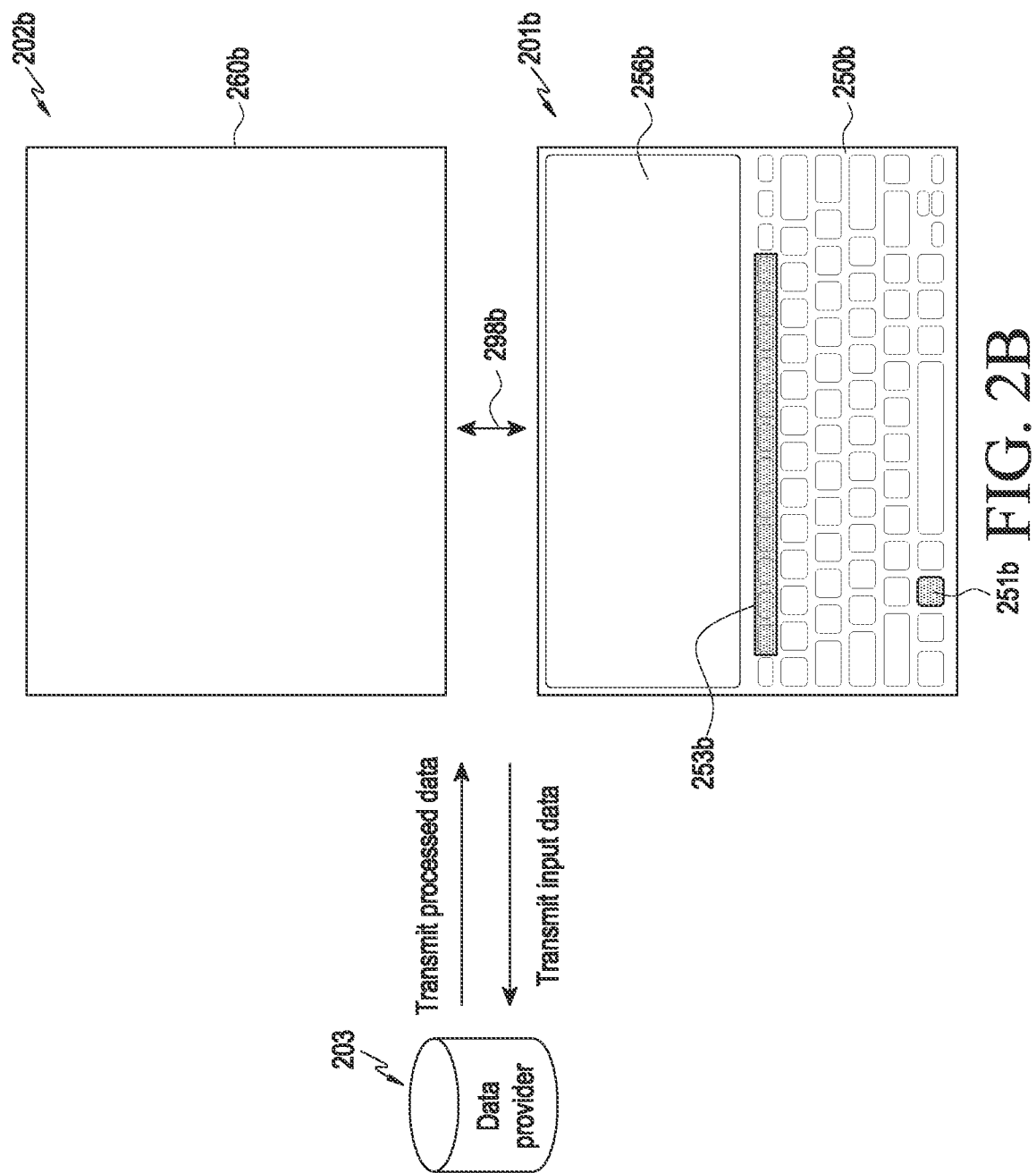

INPUT DEVICE COMPRISING TOUCHSCREEN, AND OPERATION METHOD OF SAME

CROSS-REFERENCE TO RELATED APPLICATIONS

This application is a continuation of International Application No. PCT/KR2021/014815, designating the United States, filed on Oct. 21, 2021, in the Korean Intellectual Property Receiving Office and claiming priority to Korean Patent Application No. 10-2020-0177096, filed on Dec. 17, 2020 in the Korean Intellectual Property Office. The disclosures of each of these applications are incorporated by reference herein in their entireties.

BACKGROUND

Field

The disclosure relates to an input device including a touchscreen and a method for operating the same.

Description of Related Art

A keyboard, which is an input device for a PC or mobile device, is used as a device for inputting text or commands by simply transmitting text key input and function key input to the system. Today, it is generally required to use multimedia, such as various types of information, images, and moving pictures, displayed in a task window for productivity and communication activities, which are the main purposes of PC or mobile device. High frequency switching and manipulation between multiple task windows are required for processing and input in the standards.

SUMMARY

As the task of simply inputting text or commands is performed using a conventional keyboard which only provides uni-lateral key entry, active task execution is limited.

According to an embodiment, an input device including a touchscreen, and a method for operating the same, transmit various related standards of results to the system upon text entry, minimizing manipulation and maximizing productivity.

According to an embodiment, an electronic device may include a display, a touchscreen, a keyboard-type input device including a plurality of keys, and a processor. The processor may be configured to receive a first input to a designated toggle key included in the keyboard-type input device, receive a user input through the keyboard-type input device after receiving the first input to the toggle key, display text corresponding to the user input on each of the touchscreen and the display, display content associated with the text on the touchscreen based on a selected linked function, receive a first touch input at a position where the content is displayed on the touchscreen, and stop displaying the text displayed on the display and display the content on the display, based on the first touch input.

According to an embodiment, an input device may include a communication module configured to perform communication with an output device, a touchscreen, a keyboard-type input device including a plurality of keys, and a processor. The processor may be configured to receive a first input to a designated toggle key included in the keyboard-type input device, receive a user input through the keyboard-type input device after receiving the first input to the toggle key, display text corresponding to the user input on the touchscreen, control the communication module to transmit, to the output device, first information for displaying the text corresponding to the user input on a display of the output device, control the communication module to receive, from the output device, second information about content associated with the text, based on a selected linked function, display the content on the touchscreen, based on the received second information, receive a first touch input at a position where the content is displayed on the touchscreen, and control the communication module to transmit, to the output device, third information for stopping the display of the text displayed on the display of the output device and displaying the content on the display of the output device, based on the first touch input.

According to an embodiment, an output device may include at least one communication module, a display, and a processor. The processor may be configured to control the at least one communication module to receive, from an input device, first information for displaying text corresponding to a user input of the input device on the display, display the text corresponding to the user input of the input device on the display, based on the received first information, control the at least one communication module to transmit, to the input device, second information about content associated with the text, based on a selected linked function, control the at least one communication module to receive, from the input device, third information generated from the input device based on a first touch input at a position where the content is displayed on a touchscreen of the input device, and stop displaying the text displayed on the display and display the content on the display, based on the received third information.

According to an embodiment, there may be provided an input device including a touchscreen and a method for operating the same. Further, according to an embodiment, there may be provided an output device used together with an input device including a touchscreen and a method for operating the same. Accordingly, the user may transmit processing results in various standards, related to the text being input using the input device, to the computing device or output device, maximizing the task processing efficiency.

BRIEF DESCRIPTION OF THE DRAWINGS

FIG. 2B illustrates example devices in a network environment according to an embodiment;

DETAILED DESCRIPTION

Figure 1:
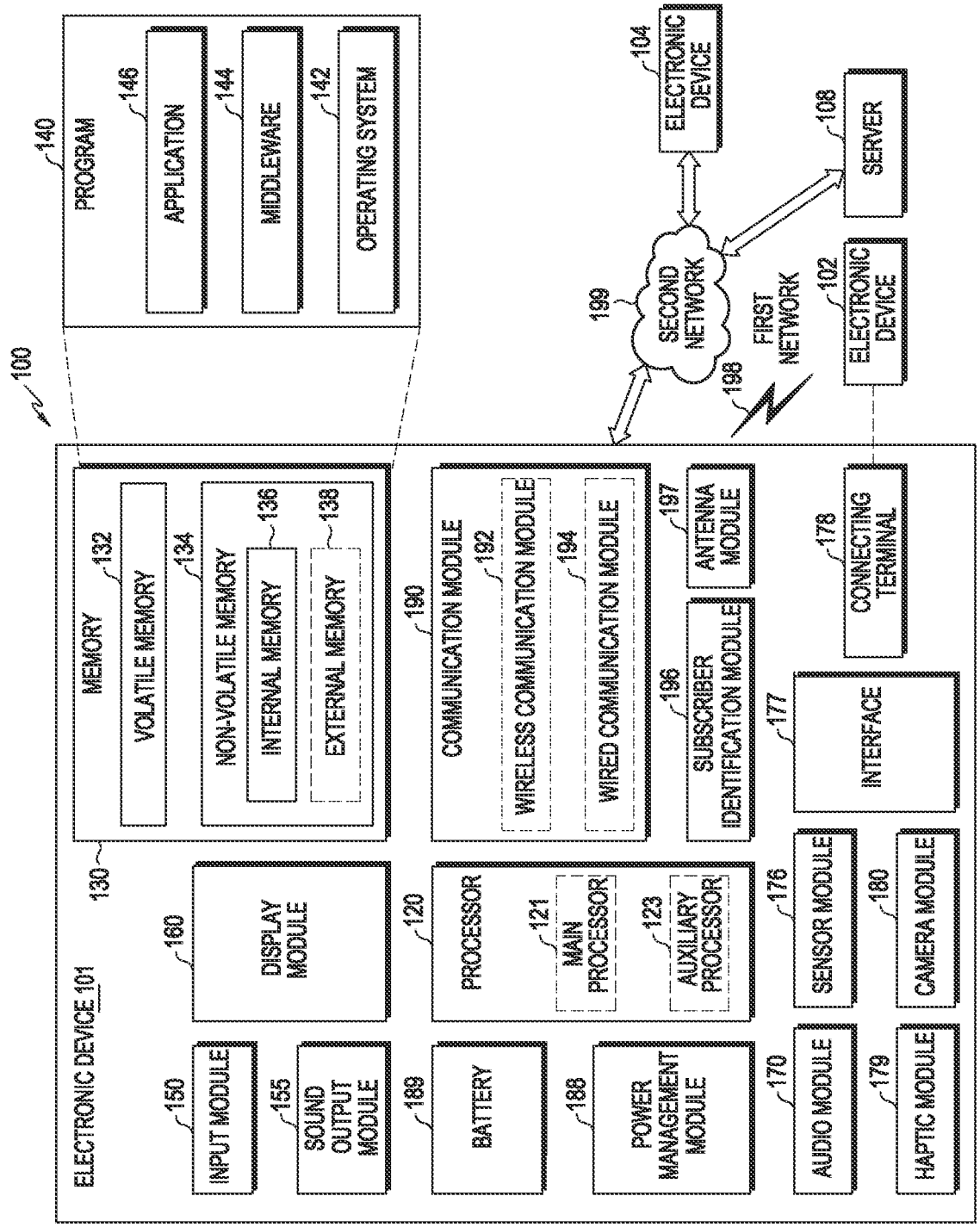
FIG. 1 is a view illustrating an example electronic device in a network environment according to an embodiment.

FIG. 1 is a block diagram illustrating an example electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of or including a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
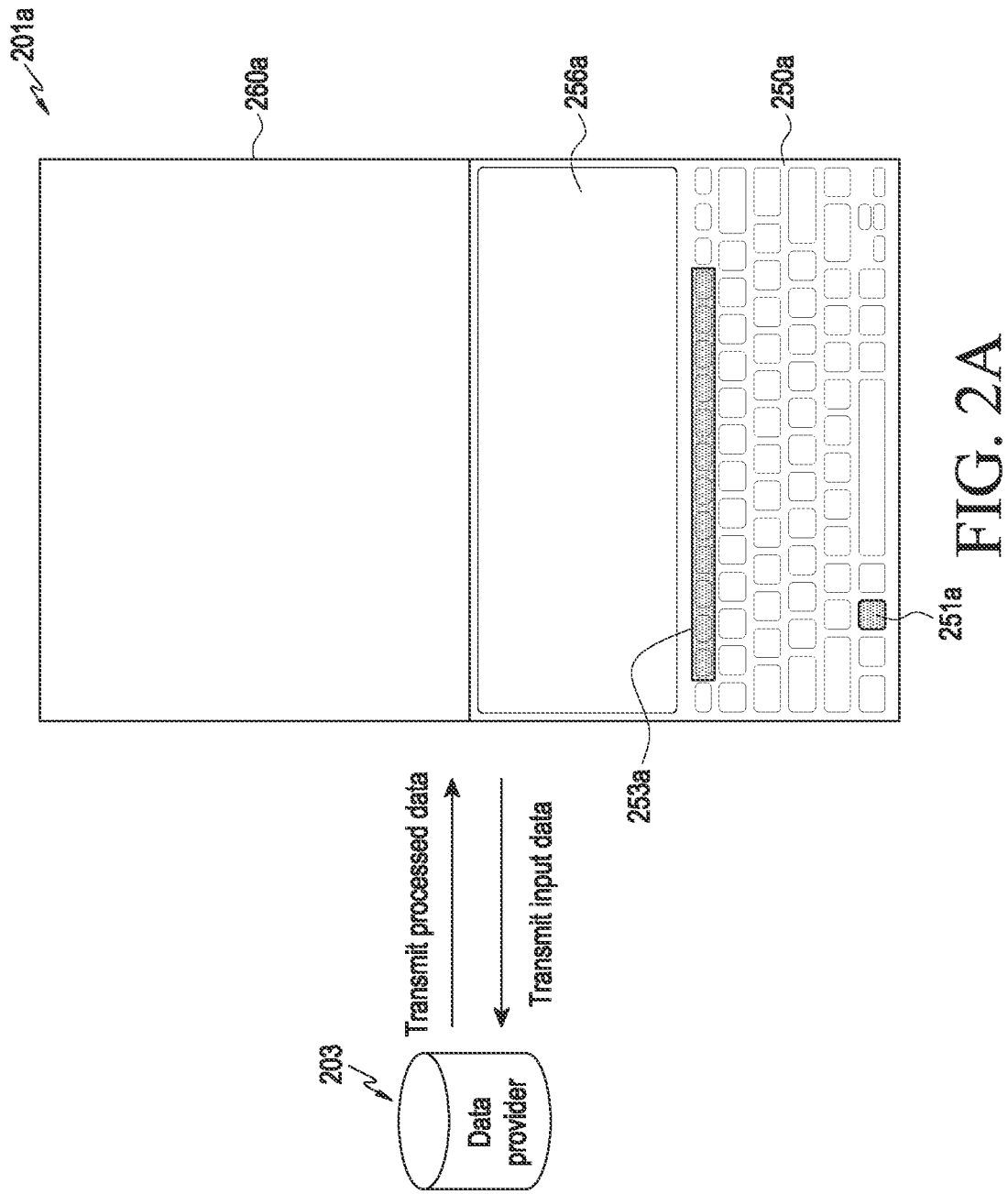
FIG. 2A illustrates example devices in a network environment according to an embodiment.

FIG. 2A illustrates example devices in a network environment according to an embodiment.

Referring to FIG. 2A, according to an embodiment, a network environment may include an electronic device 201a (e.g., the electronic device 101 of FIG. 1) and a data provider 203.

Although FIG. 2A illustrates that the data provider 203 is an external device different from and not included as part of the electronic device 201a and is an external source transmitting/receiving data to/from the electronic device 201a, this is merely an example, and the data provider 203 may be a memory included in the electronic device 201a or an application executed on the electronic device 201a.

According to an embodiment, when the data provider 203 is an external device different from the electronic device 201a, the electronic device 201a may transmit input data including a query to request content to the data provider 203 and receive processed data including information about the content corresponding to the query from the data provider 203. When the data provider 203 is implemented as an external device independent from the electronic device 201a, the data provider 203 may include a communication module capable of transmitting/receiving data to/from the electronic device 201a, a storage module storing a database including the data corresponding to the query received from the electronic device 201a, and a processor for searching for (or identifying) the data corresponding to the query.

According to an embodiment, when the data provider 203 is a specific application executed on the electronic device 201a, another specific application executed on the electronic device 201a and the data provider 203 may transmit/receive queries to request information from each other and information about the content corresponding to the queries.

According to an embodiment, the electronic device 201a may include a display 260a, a touchscreen 256a, and a keyboard-type input device 250a including a plurality of keys. For example, the keyboard-type input device 250a may include a toggle key 251a or a function key(s) 253a. Although FIG. 2A illustrates that there are one toggle key 251a and a plurality of function keys 253a, this is merely an example, and the number of toggle keys 251a and function keys 253a is not limited. In various examples, the toggle key 251a and/or the function key 253a may be implemented not to be included in the keyboard-type input device 250a. For example, one of ordinary skill in the art will understand that the toggle key 251a and/or the function key 253a may be implemented in the form of soft-keys displayed on the touchscreen 256a.

FIG. 2B illustrates example devices in a network environment according to an embodiment.

Referring to FIG. 2B, according to an embodiment, a network environment may include an input device 201b, an output device 202b, and a data provider 203. For example, the input device 201b may be the electronic device 101 of FIG. 1, and the output device 202b may be the electronic device 102 of FIG. 1. As another example, the input device 201b may be the electronic device 102 of FIG. 1, and the output device 202b may be the electronic device 101 of FIG. 1. For the description of FIG. 2B, the input device 201b and the output device 202b are shown as being different, but both the input device 201b and the output device 202b may be of the same type as the electronic device 101 of FIG. 1.

According to an embodiment, the input device 201b may include a touchscreen 256b and a keyboard-type input device 250b including a plurality of keys. For example, the keyboard type input device 250b may include a toggle key 251b or a function key(s) 253b. The toggle key 251b and the function key 253b may be understood with reference to the description of the toggle key 251a and the function key 253a of FIG. 2A.

According to an embodiment, the input device 201b may perform a function similar to that of the electronic device 201a of FIG. 2A. For example, the input device 201b may perform an operation which is performed by the electronic device 201a of FIG. 2A using the display 260a of FIG. 2A, by using the output device 202b including the display 260b (e.g., the display module 160 of FIG. 1).

According to an embodiment, the input device 201b may perform communication 298b with the output device 202b, but the type of communication is not limited.

Although FIG. 2B illustrates that the data provider 203 is an external device different from and not included in the input device 201b or the output device 202b and is an external source transmitting/receiving data to/from the input device 201b or output device 202b, this is merely an example, and the data provider 203 may be a memory included in the input device 201b or the output device 202b or an application executed on the input device 201b or the output device 202b.

According to an embodiment, when the data provider 203 is an external device distinguished from the input device 201b or the output device 202b, the data provider 203 may transmit/receive data to/from at least one of the input device 201b or the output device 202b, and in this regard, the data provider 203 has been described in detail in connection with FIG. 2A.

According to an embodiment, the data provider 203 may be a specific application executed on the input device 201b or output device 202b, and in this regard, the data provider 203 has been described in detail in connection with FIG. 2A.

Figure 2C:
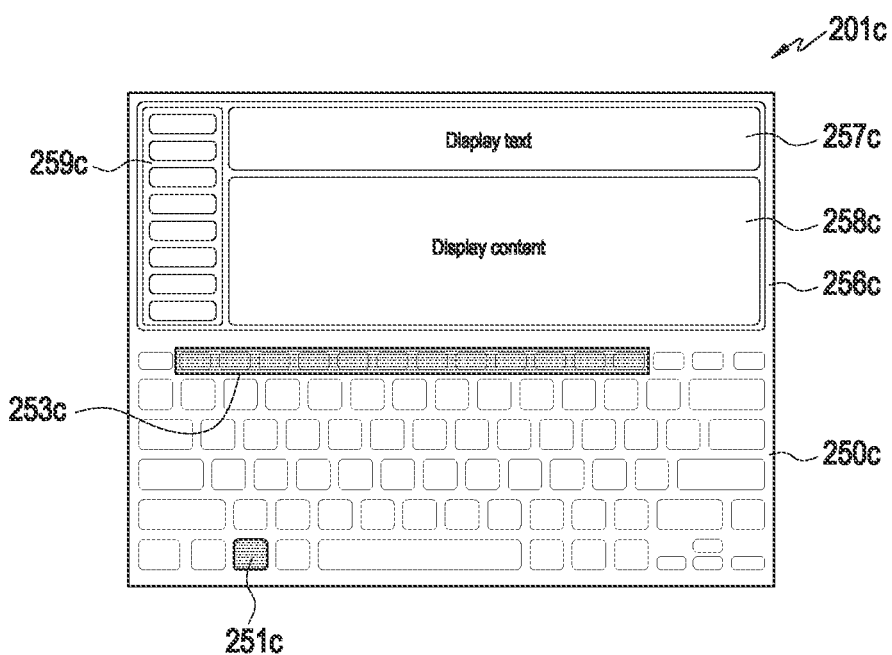
FIG. 2C illustrates an example device in a network environment according to an embodiment.

FIG. 2C illustrates an example device in a network environment according to an embodiment.

FIG. 2C is a view for describing in detail the electronic device 201a of FIG. 2A and the input device 201b of FIG. 2B according to an embodiment. For example, the electronic device 201c of FIG. 2C may refer, for example, to the electronic device 201a of FIG. 2A or the input device 201b of FIG. 2B. Accordingly, it may be understood that descriptions of the electronic device 201a of FIG. 2A, the input device 201b of FIG. 2B, and the electronic device 201c of FIG. 2C may be commonly applied within a mutually applicable range.

Referring to FIG. 2C, according to an embodiment, an electronic device 201c (e.g., the electronic device 101 of FIG. 1) may include a touchscreen 256c and a keyboard-type input device 250c including a plurality of keys. For example, the touchscreen 256c may refer to the touchscreen 256a of FIG. 2A or the touchscreen 256b of FIG. 2B. Further, for example, the keyboard-type input device 250c may refer to the keyboard-type input device 250a of FIG. 2A or the keyboard-type input device 250b of FIG. 2B.

According to an embodiment, the keyboard-type input device 250c may include a toggle key 251c or a function key(s) 253c.

According to an embodiment, the touchscreen 256c may include an area 257c displaying text, an area 258c displaying content, and an area 259c displaying a linked function list. Although each area of the touchscreen 256c is shown as being fixed in a specific position in FIG. 2C, this is merely an example, and the size and position of each area of the touchscreen 256c may vary, and the areas of the touchscreen 256c are not necessarily simultaneously displayed.

According to an embodiment, text input by the keyboard-type input device 250c may be displayed in the area 257c of the touchscreen 256c where text is displayed, and a detailed description of the text display is described below.

According to an embodiment, content associated with text may be displayed in the content display area 258c of the touchscreen 256c, and a detailed description of the content display is described below.

According to an embodiment, the linked functions displayed in the area 259*c* where the linked function list of the touchscreen 256*c* is displayed may include an automatic function, a search function, an image search function, a translation function, an emoji function, a macro function, or a contact search function, and a detailed description of the linked function is given below.

Figure 3A:
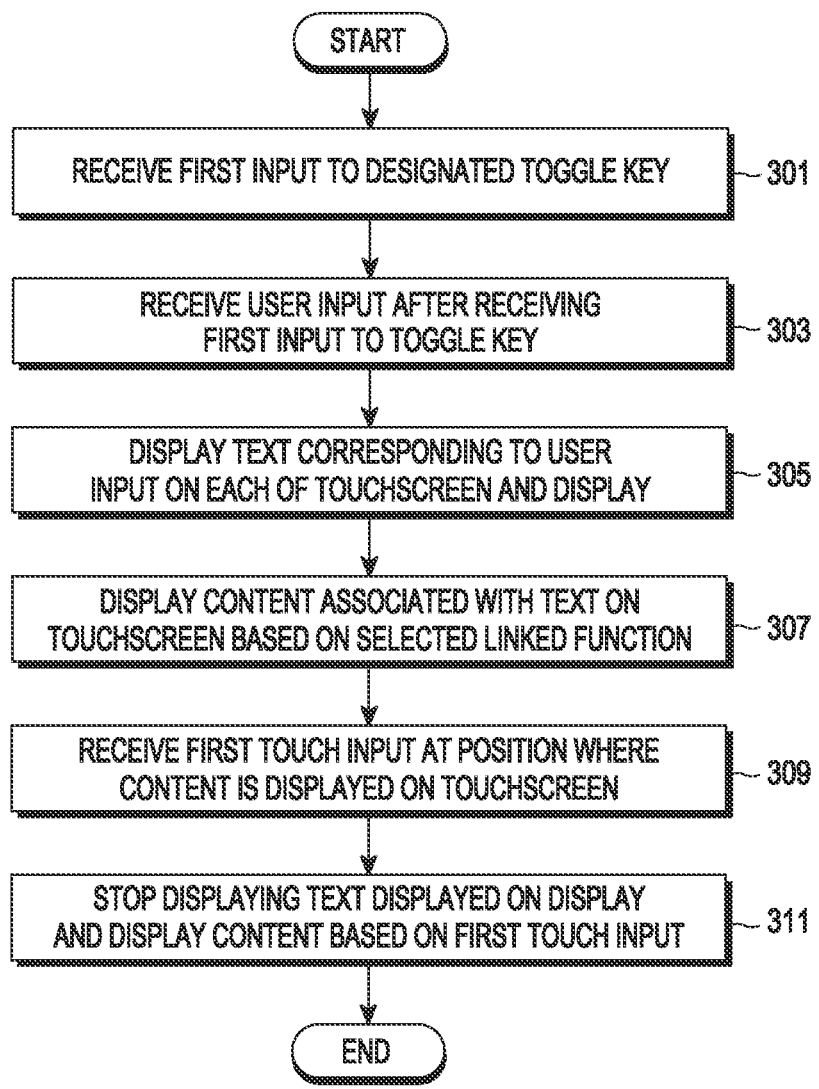
FIG. 3A is a flowchart illustrating an example operation method of an example electronic device according to an embodiment.
Figure 3B:
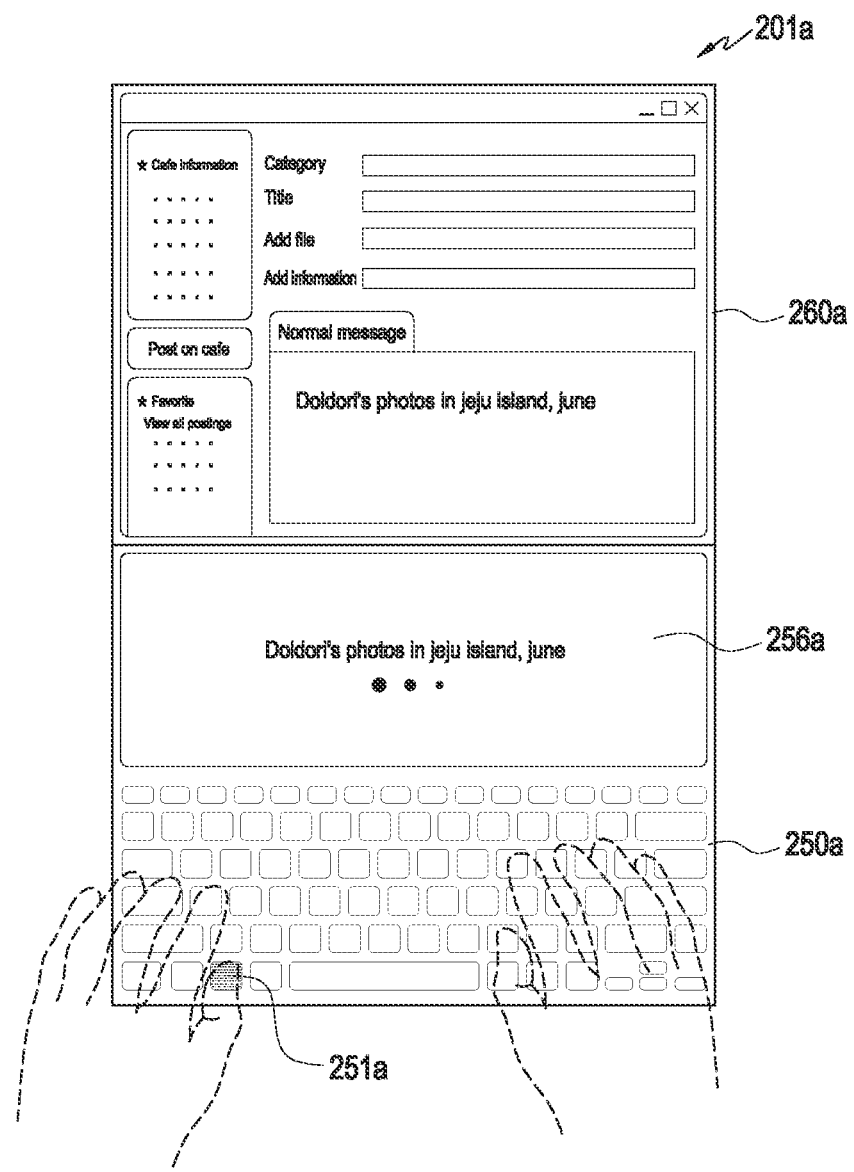
FIG. 3B is a view illustrating an example electronic device according to an embodiment.
Figure 3C:
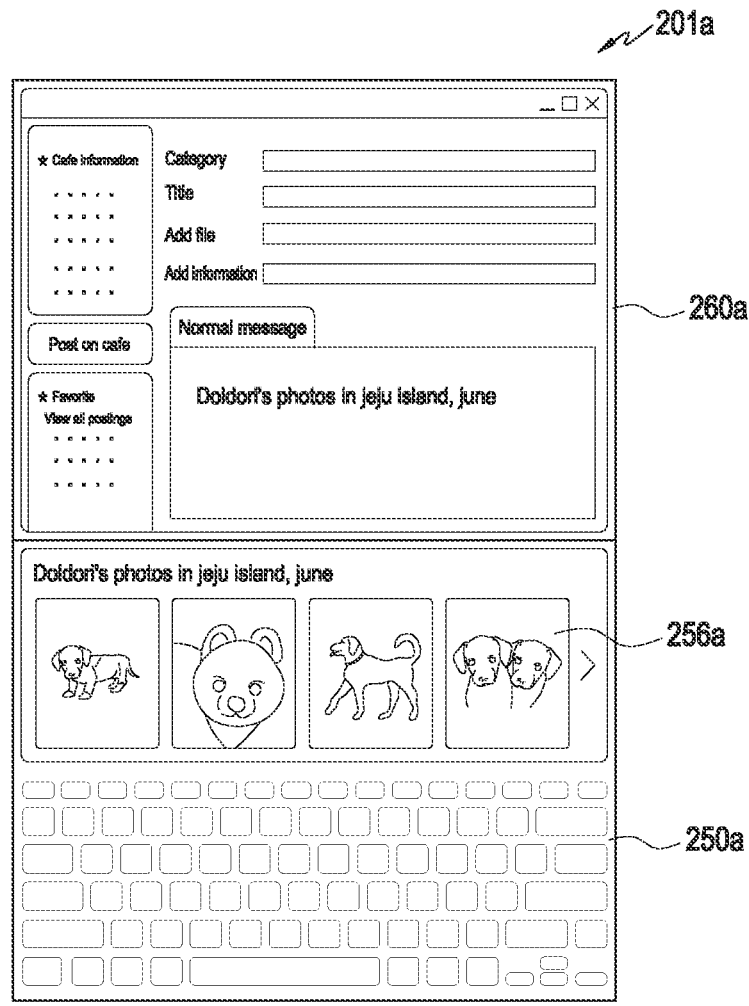
FIG. 3C is a view illustrating an example electronic device according to an embodiment.
Figure 3D:
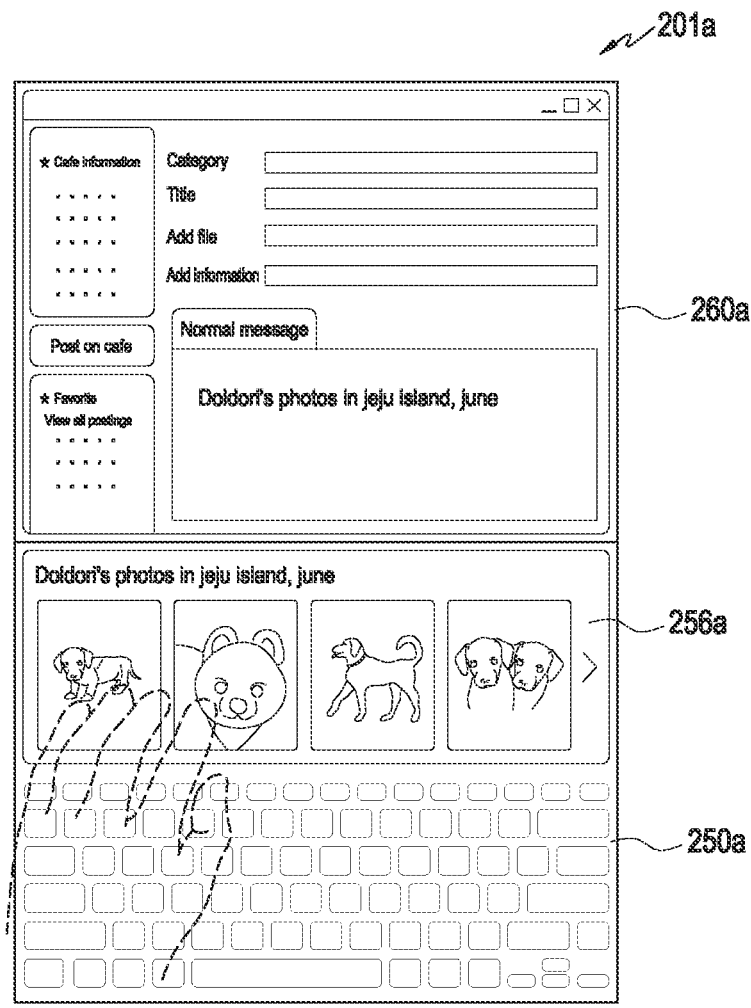
FIG. 3D is a view illustrating an example electronic device according to an embodiment.
Figure 3E:
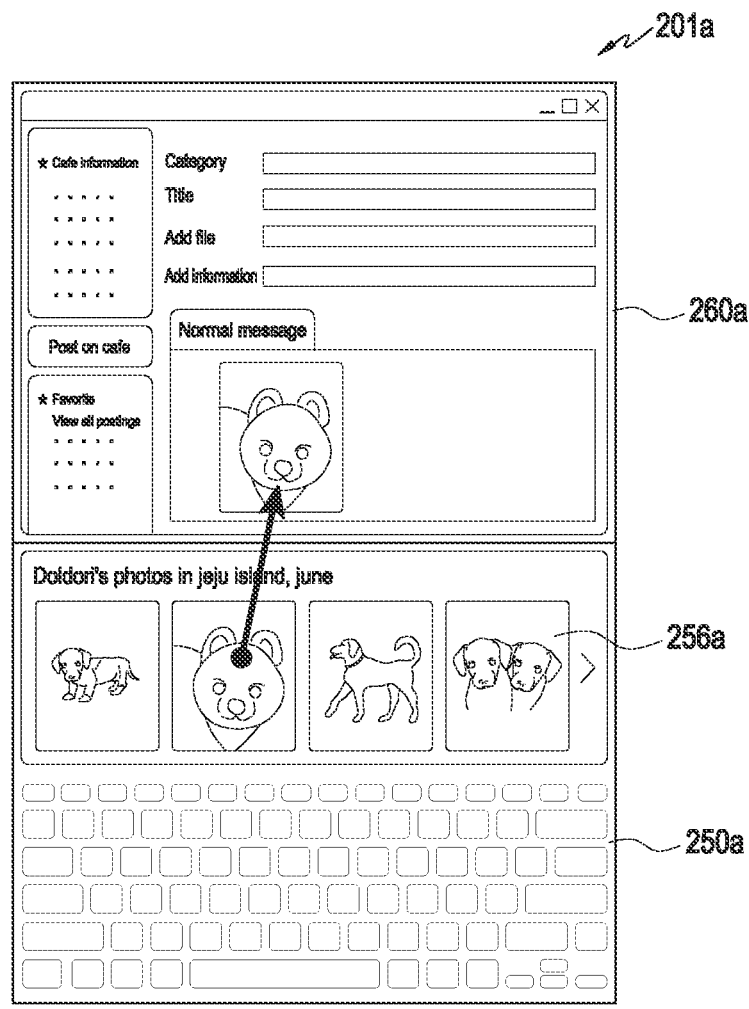
FIG. 3E is a view illustrating an example electronic device according to an embodiment.

FIG. 3A is a flowchart illustrating an example operation method of an example electronic device according to an embodiment. FIG. 3A is described with reference to FIGS. 3B, 3C, 3D, and 3E. FIGS. 3B, 3C, 3D, and 3E are views of an example electronic device according to an embodiment.

Referring to FIG. 3A, in operation 301, according to an embodiment, the electronic device 201*a* (e.g., the processor 120) may receive an input (e.g., first input) to a designated toggle key 251*a* included in the keyboard-type input device 250*a*. According to an embodiment, when receiving an input (e.g., first input) to the toggle key 251*a*, the electronic device 201*a* may identify that a function assigned to the toggle key 251*a* is activated. For example, when the function allocated to the toggle key 251*a* is activated, the electronic device 201*a* may identify the user input received thereafter.

In operation 303, according to an embodiment, the electronic device 201*a* may receive the user input. For example, referring to FIG. 3B, the electronic device 201*a* may receive the user input through the keyboard-type input device 250*a* after receiving the first input to the toggle key 251*a*. For example, the electronic device 201*a* may receive the user input made by the user to display text through the keyboard-type input device 250*a*. The electronic device 210*a* may identify text based on at least one input to at least one key of the keyboard-type input device 250*a*.

In operation 305, according to an embodiment, the electronic device 201*a* may display text corresponding to the received user input on each of the touchscreen 256*a* and the display 260*a*. For example, referring to FIG. 3B, the electronic device 201*a* may simultaneously display text (e.g., "Doldori's photos in Jeju island, June) corresponding to the received user input on the touchscreen 256*a* and the display 260*a*.

For example, the electronic device 201*a* may execute a first application. An execution screen of the first application may be displayed on the display 260*a*. For example, the first application may support text input, and the text identified based on the user input through the keyboard-type input device 250*a* may be additionally applied to the execution screen of the first application. The text-applied position may be determined corresponding to, e.g., an object (e.g., cursor) indicating the input position of the text, but is not limited. The screen displayed on the touchscreen 256*a* may be provided by, e.g., the first application or by a second application different from the first application. For example, when the first application supports the function of generating and transmitting a query including text, the screen provided by the first application may be displayed on the touchscreen 256*a*. Or, the second application supporting the function of generating and transmitting queries may be executed (or activated) based on activation of the toggle key 251*a* and be displayed on the touchscreen 256*a*. The second application may be always on depending on implementations. In this case, the user input may be implemented to be assigned to both the first application and the second application.

In operation 307, according to an embodiment, the electronic device 201*a* may display content associated with the text corresponding to the selected linked function on the touchscreen 256*a*. For example, referring to FIG. 3C, the electronic device 201*a* may display, on the touchscreen 256*a*, content (e.g., at least one image corresponding to "Doldori's photos in Jeju island, June) associated with the text corresponding to the received user input, based on the selected linked function (e.g., image search function). By operations 305 and 307, the text corresponding to the user input and the content associated with the text may be displayed on the touchscreen 256*a* of the electronic device 201*a*, and the text corresponding to the user input may be displayed on the display 260*a* of the electronic device 201*a*.

According to an embodiment, the content associated with text may be content generated inside the electronic device 201*a*, content stored in the memory (e.g., the memory 130) of the electronic device 201*a*, or content provided by another device performing communication with the electronic device 201*a*, based on the selected linked function. A specific embodiment of the content corresponding to the selected linked function is described below.

According to an embodiment, there is no limitation on when the linked function is selected. For example, when a specific linked function (e.g., a first linked function) is selected, as the linked function, before operation 307 is performed, the electronic device 201*a* may display specific content (e.g., first content) corresponding to the specific linked function (e.g., first linked function) on the touchscreen 256*a* in step 307. Further, for example, when the selected linked function is changed from the specific linked function (e.g., first linked function) to another specific linked function (e.g., second linked function) while displaying the specific content (e.g., first content) corresponding to the specific linked function (e.g., first linked function) in operation 307, the electronic device 201*a* may stop displaying the specific content (e.g., first content) and re-perform operation 307 to display another specific content (e.g., second content) corresponding to the selected other specific linked function (e.g., second linked function) on the touchscreen 256*a*. The selection of the linked function is described below.

In operation 309, according to an embodiment, the electronic device 201*a* may receive a touch input (e.g., first touch input) at the position where content is displayed on the touchscreen 256*a*. According to an embodiment, the first touch input at the position where the content is displayed on the touchscreen 256*a* may be performed by the user's finger or a stylus pen (not shown), but the touch input method is not limited. For example, referring to FIG. 3D, at least one content may be displayed on the touchscreen 256*a* of the electronic device 201*a*, and the user may perform a first touch input to touch the position where one of at least one content is displayed using her finger or a stylus pen (not shown). In this case, the electronic device 201*a* may identify selection of the content present at the position where the first touch input is performed.

In operation 311, according to an embodiment, the electronic device 201*a* may stop displaying the text displayed on the display 260*a*, based on a touch input (e.g., first touch input) at the position where the content is displayed on the touchscreen 256*a* and display the content corresponding to the touch input on the display 260*a*. For example, referring to FIG. 3E, upon receiving the first touch input at the position where content is displayed on the touchscreen 256*a*, the electronic device 201*a* may stop displaying the text displayed on the display 260*a* and display the content selected by the first touch input on the display 260*a*. The operation of stopping the text display and displaying content may be represented as replacing text with content.

According to another embodiment, the electronic device 201*a* may display the content corresponding to touch input on the display 260a based on the touch input (e.g., first touch input) received while displaying text on the display 260a. For example, upon receiving the first touch input at the position where content is displayed on the touchscreen 256a, the electronic device 201a may keep on displaying the text displayed on the display 260a and display the content selected by the first touch input on the display 260a.

Descriptions of the subsequent drawings of the disclosure overlapping with the above description of FIG. 3 are not repeated below.

Figure 4:
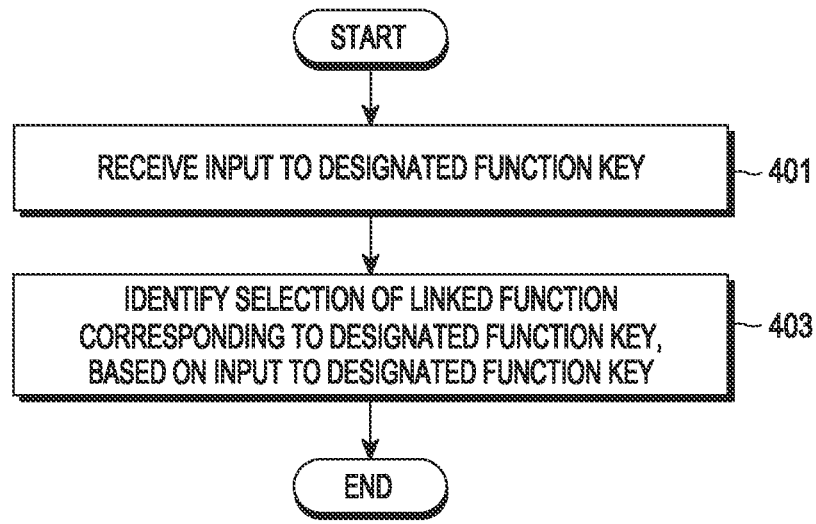
FIG. 4 is a flowchart illustrating an example operation method of an example electronic device according to an embodiment.

FIG. 4 is a flowchart illustrating an example operation method of an example electronic device according to an embodiment. Referring to FIG. 2A, FIG. 4 is described.

Referring to FIG. 4, in operation 401, according to an embodiment, the electronic device 201a (e.g., the processor 120) may receive an input to a designated function key 253a included in the keyboard-type input device 250a. For example, when the keyboard-type input device 250a includes a plurality of function keys 253a, the electronic device 201a may receive an input to one function key 253a among the plurality of function keys 253a. Or, for example, when the keyboard-type input device 250a includes one function key 253a, the electronic device 201a may receive one or more inputs to the one function key 253a. In the disclosure, the input to the function key 253a may refer, for example, to receiving an input to the function key 253a alone or simultaneous or sequential inputs to the designated function key 253a and a specific key.

In operation 403, according to an embodiment, the electronic device 201a may identify selection of the linked function corresponding to the designated function key 253a based on the input to the designated function key 253a.

According to an embodiment, when the keyboard-type input device 250a includes a plurality of function keys 253a, the electronic device 201a may identify selection of the specific linked function corresponding to the specific function key 253a based on reception of the input to the specific function key 253a among the plurality of function keys 253a.

According to an embodiment, when the keyboard-type input device 250a includes one function key 253a, the electronic device 201a may identify selection of the linked function corresponding to the input to the function key 253a based on the number of receptions of input to the one function key 253a. For example, assuming that the linked functions include a first linked function, a second linked function, and a third linked function, if the first linked function is currently selected, the electronic device 201a may identify selection of the second linked function upon receiving one input to the function key 253a and, upon receiving one more input to the function key 253a, identify selection of the third linked function, and upon receiving one additional input to the function key 253a, identify selection of the first linked function.

Figure 5:
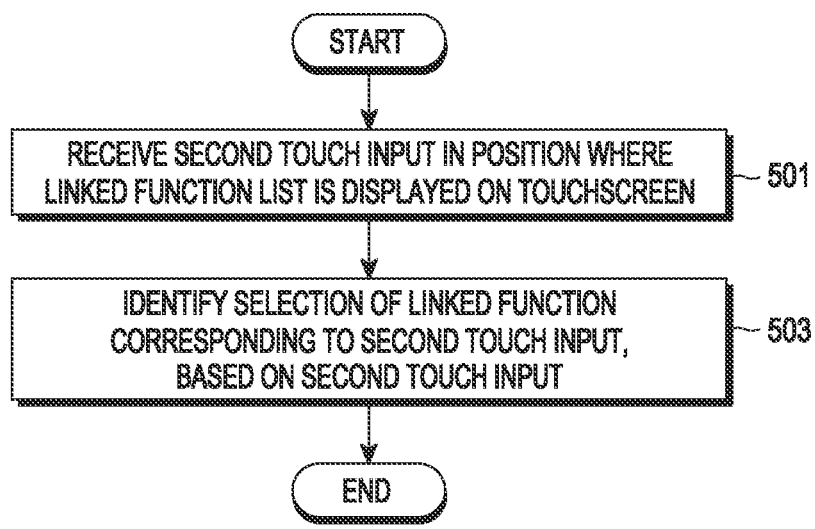
FIG. 5 is a flowchart illustrating an example operation method of an example electronic device according to an embodiment.

FIG. 5 is a flowchart illustrating an example operation method of an example electronic device according to an embodiment. Referring to FIG. 2A, FIG. 5 is described.

Referring to FIG. 5, in operation 501, according to an embodiment, the electronic device 201a (e.g., the processor 120) may receive a touch input (e.g., second touch input) at the position where the linked function list is displayed on the touchscreen 256a. For example, the electronic device 201a may display a linked function list including at least one linked function in one area (e.g., the area 259c of FIG. 2C), and the electronic device 201a may receive the second touch input at the position where one linked function among at least one linked function included in the displayed linked function list is displayed.

In operation 503, according to an embodiment, the electronic device 201a may identify selection of a specific linked function corresponding to a touch input, based on the touch input (e.g., second touch input) at the position of display of one linked function among at least one linked function included in the linked function list displayed in one area (e.g., the area 259c of FIG. 2C) of the touchscreen 256a.

Figure 6:
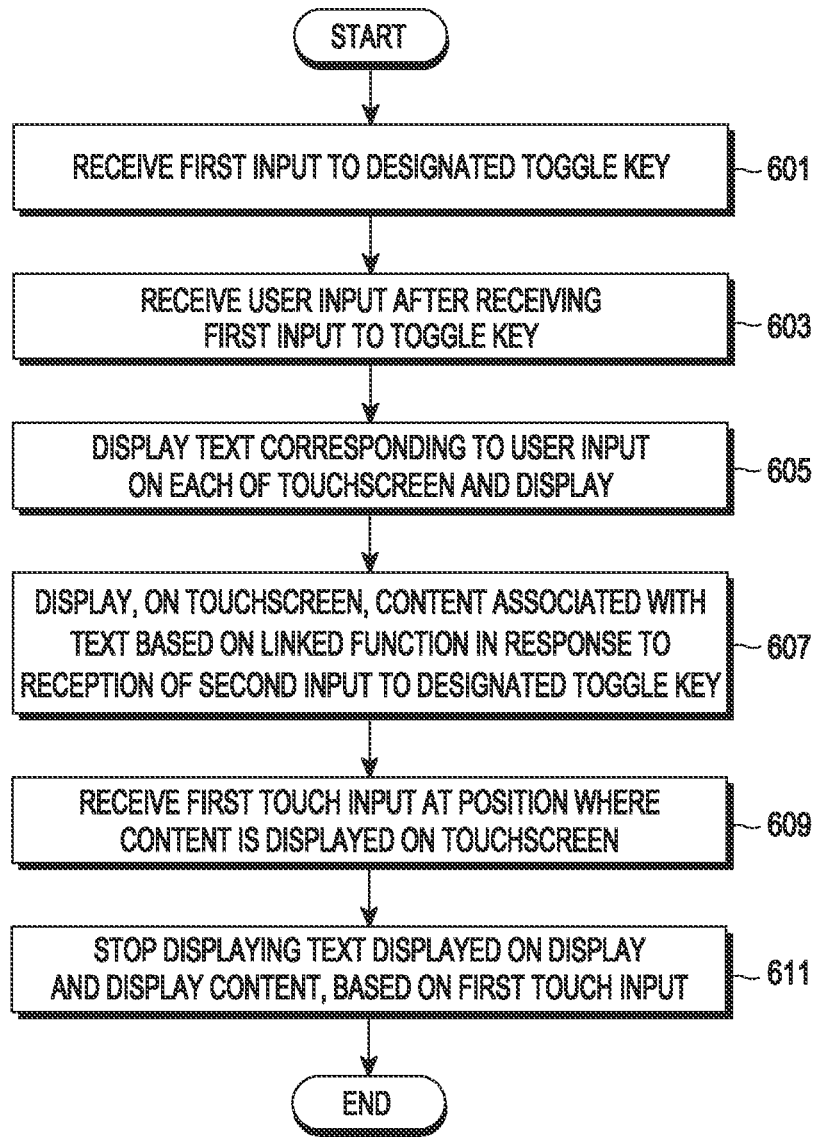
FIG. 6 is a flowchart illustrating an example operation method of an example electronic device according to an embodiment.

FIG. 6 is a flowchart illustrating an example operation method of an example electronic device according to an embodiment. Referring to FIG. 2A, FIG. 6 is described.

Referring to FIG. 6, in operation 601, according to an embodiment, the electronic device 201a (e.g., the processor 120) may receive an input (e.g., first input) to a designated toggle key 251a included in the keyboard-type input device 250a.

In operation 603, according to an embodiment, the electronic device 201a may receive user input. For example, the electronic device 201a may receive the user input through the keyboard-type input device 250a after receiving the first input to the toggle key 251a.

In operation 605, according to an embodiment, the electronic device 201a may display text corresponding to the received user input on each of the touchscreen 256a and the display 260a.

In operation 607, according to an embodiment, the electronic device 201a may display content associated with the text on the touchscreen 256a based on the selected linked function, in response to reception of the input (e.g., second input) to the designated toggle key 251a. For example, upon receiving the second input to the designated toggle key 251a after receiving the first input to the designated toggle key 251a, the electronic device 201a may display, on the touchscreen 256a, content associated with the text corresponding to a user input received between the time of reception of the first input to the designated toggle key 251a and the time of reception of the second input, based on the selected linked function. By operations 605 and 607, the text corresponding to the user input received between the time of reception of the first input to the designated toggle key 251a and the time of reception of the second input and the content associated with the text may be displayed on the touchscreen 256a of the electronic device 201a, and the text corresponding to the user input received between the time of reception of the first input to the designated toggle key 251a and the time of reception of the second input may be displayed on the display 260a of the electronic device 201a.

As described above, according to an embodiment, the time of selection of the linked function is not limited. For example, even after the second input to the designated toggle key 251a is received, the selected linked function may be changed from a specific linked function (e.g., first linked function) to another specific linked function (e.g., second linked function) and, in this case, the electronic device 201a may stop displaying the specific content (e.g., first content) corresponding to the specific linked function (e.g., first linked function) displayed before the selected linked function and display other specific content (e.g., second content) corresponding to another selected specific linked function (e.g., second linked function) on the touchscreen 256a.

In operation 609, according to an embodiment, the electronic device 201a may receive a touch input (e.g., first touch input) at the position where content is displayed on the touchscreen 256a as described above.

In operation 611, according to an embodiment, the electronic device 201*a* may stop displaying the text displayed on the display 260*a*, based on a touch input (e.g., first touch input) at the position where the content is displayed on the touchscreen 256*a* and display the content selected by the touch input on the display 260*a*, as described above.

According to an embodiment, as described above, upon receiving a touch input (e.g., the first touch input) in the position where content is displayed on the touchscreen 256*a*, the electronic device 201*a* may keep on displaying the text displayed on the display 260*a* and display the content selected by the touch input (e.g., the first touch input) on the display 260*a*.

Figure 7:
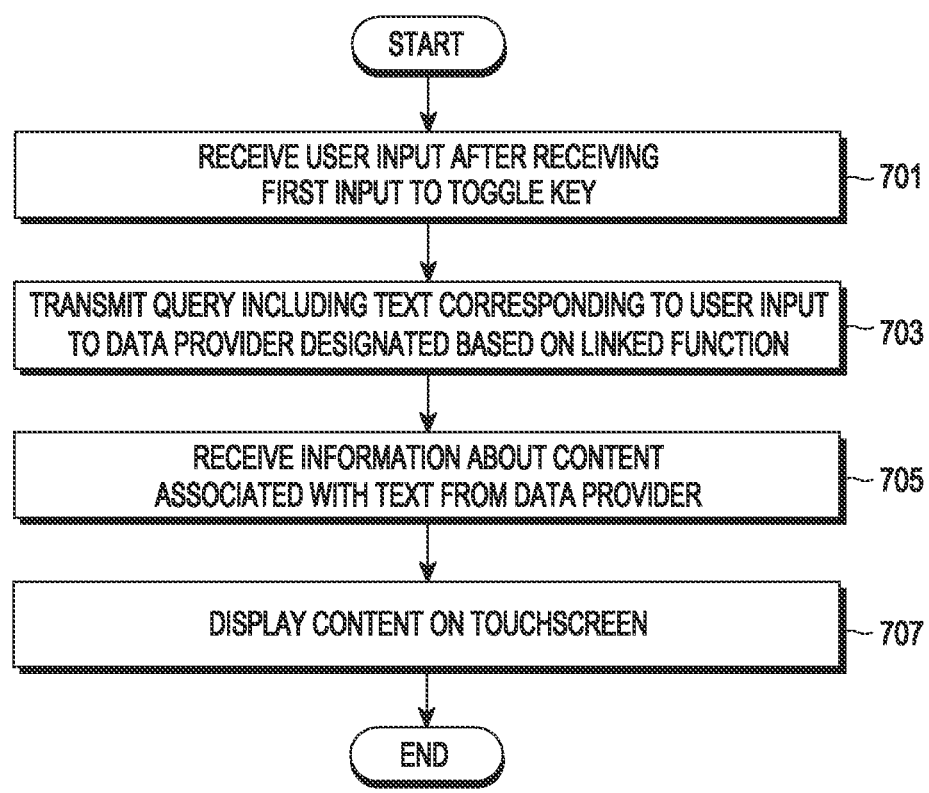
FIG. 7 is a flowchart illustrating an example operation method of an example electronic device according to an embodiment.

FIG. 7 is a flowchart illustrating an example operation method of an example electronic device according to an embodiment. FIG. 7 is a view for describing in detail operations between the data provider 203 and the electronic device 201*a* disclosed in FIG. 2A. Referring to FIG. 2A, FIG. 7 is described.

Referring to FIG. 7, in operation 701, according to an embodiment, the electronic device 201*a* (e.g., the processor 120) may receive a user input through the keyboard-type input device 250*a* after receiving an input (e.g., first input) to a designated toggle key 251*a* included in the keyboard-type input device 250*a*.

In operation 703, according to an embodiment, the electronic device 201*a* may transmit a query including text corresponding to a user input to a designated data provider 203 based on a linked function according to a selected linked function. For example, when a specific linked function is selected as the linked function, the electronic device 201*a* may transmit the query including text corresponding to the user input to the data provider 203 designated as being used in the specific linked function.

According to an embodiment, the data provider 203 may be designated in one type or a plurality of types may be simultaneously designated. For example, an external device independent from the electronic device 201*a* and a specific application executed on the electronic device 201*a* may simultaneously be designated as the data provider 203, and the method for designating the data provider 203 corresponding to the selected linked function and the number of data providers 203 designated are not limited. When a plurality of data providers 203 are simultaneously designated corresponding to one linked function, queries including text corresponding to a user input may be transmitted to the plurality of designated data providers 203.

A specific embodiment of a specific data provider 203 used for a specific linked function is described below.

In operation 705, according to an embodiment, the electronic device 201*a* may receive information about content associated with the transmitted text from the data provider 203.

In operation 707, according to an embodiment, the electronic device 201*a* may display, on the touchscreen 256*a*, content associated with the text based on information about the content received from the specific data provider 203 used for the selected linked function.

FIGS. 8A, 8B, 8C, and 8D are views illustrating an example electronic device according to an embodiment.

Referring to FIGS. 8A, 8B, 8C, and 8D, according to an embodiment, when a search function is selected as the linked function, the electronic device 201*a* may provide a search result value related to the text corresponding to the user input, as the content associated with the input text. The search result value is information provided by the data provider (e.g., the data provider 203) described below and may include the address, image, map, phone number, website address, or shopping information related to the input text, but the type of the search result value is not limited.

According to an embodiment, when a search function is selected from among at least one linked function, a server of a specific website outside the electronic device 201*a* may be designated as the data provider 203. For example, when a specific website server is designated as the data provider 203, the designated specific website server may provide a result value searched using the search engine of the website server to the electronic device 201*a*.

According to an embodiment, when the search function is selected from among at least one linked function, a specific application executed on the electronic device 201*a* may be designated as the data provider 203. For example, the specific application designated as the data provider 203 may provide the result value used using data stored in the memory (e.g., the memory 130) of the electronic device 201*a* or data stored in a buffer (not shown) of the designated specific application to be used by the electronic device 201*a*. As another example, the specific application designated as the data provider 203 may provide the result value searched using communication with a cloud server present outside the electronic device 201*a* to be used by the electronic device 201*a*.

Figure 8A:
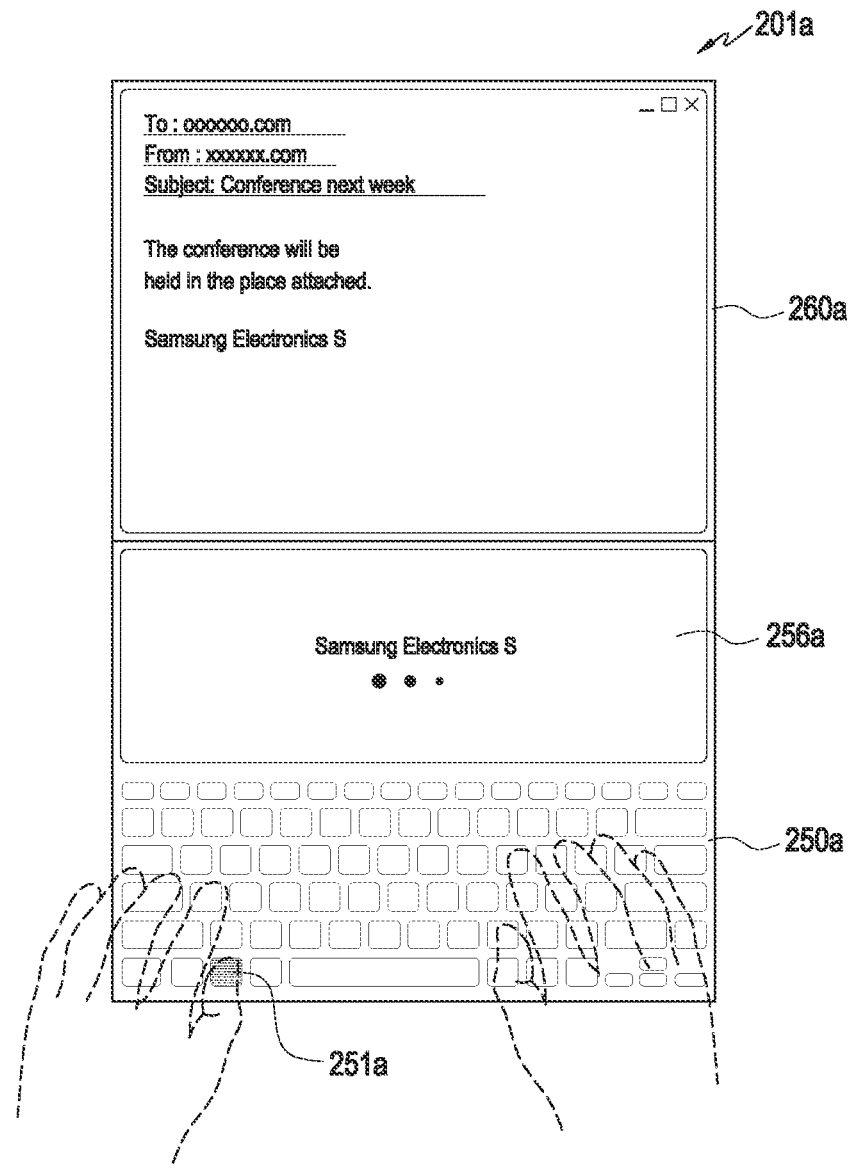
FIG. 8A is a view illustrating an example electronic device according to an embodiment.
Figure 8B:
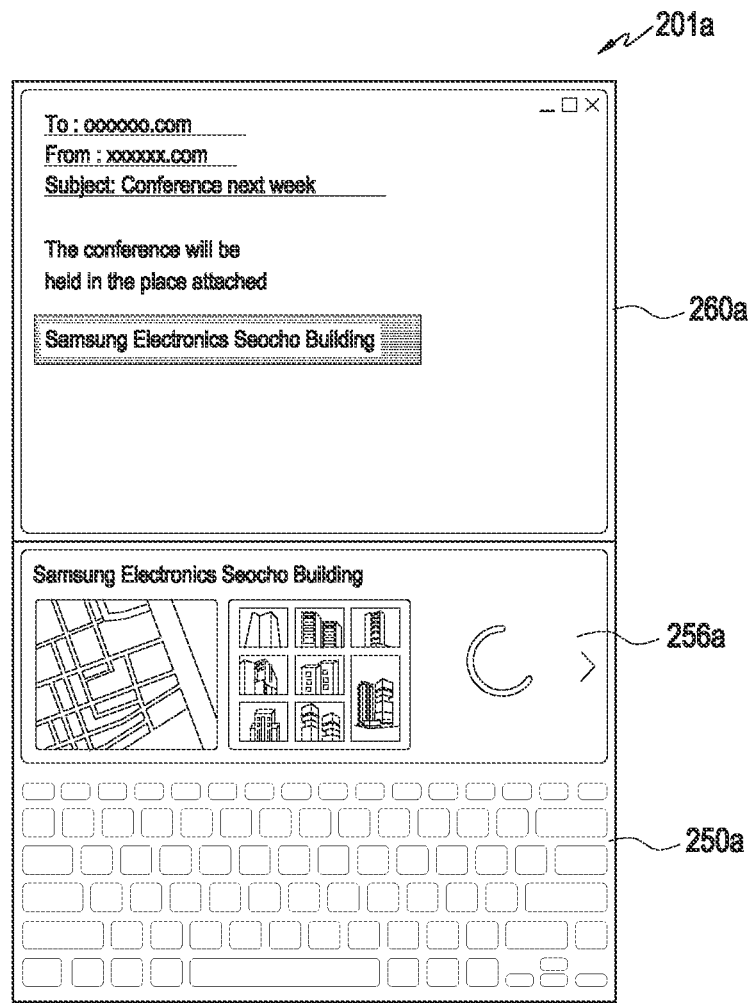
FIG. 8B is a view illustrating an example electronic device according to an embodiment.
Figure 8C:
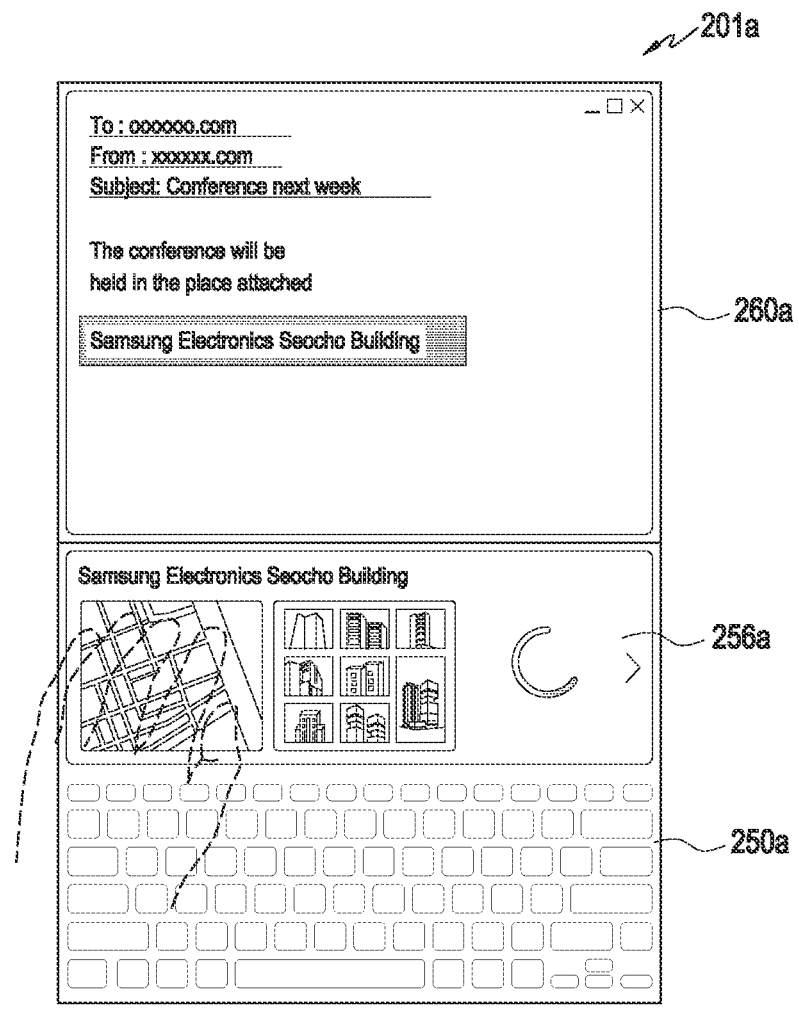
FIG. 8C is a view illustrating an example electronic device according to an embodiment.
Figure 8D:
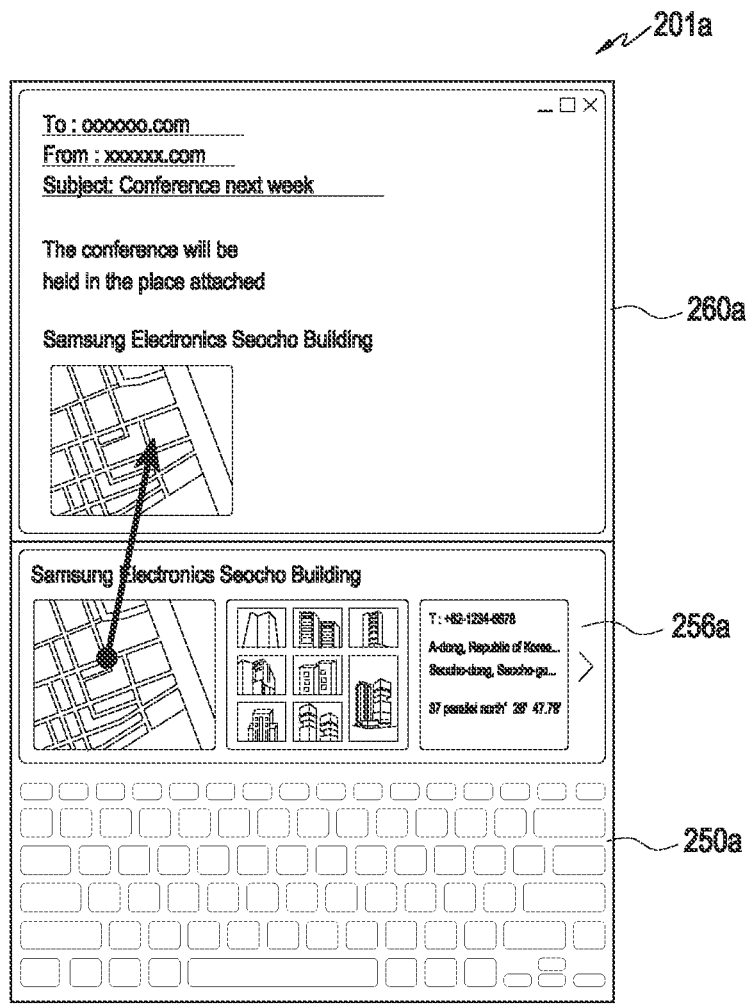
FIG. 8D is a view illustrating an example electronic device according to an embodiment.

For example, referring to FIG. 8B, the electronic device 201*a* may receive information about the content (e.g., a map related to "Samsung Electronics Seocho building" or an image related to "Samsung Electronics Seocho building") associated with the text (e.g., "Samsung Electronics Seocho building") identified based on a supplied user input (see FIG. 8A) from a specific website server designated as the data provider 203 or a specific application designated as the data provider 203 and display the received content on the touchscreen 256*a*. The user may, for example, select a map from among the received content (FIG. 8C) and cause the map to be displayed on display 260*a* as in FIG. 8D.

FIGS. 8E, 8F, 8G, and 8H are views of an example electronic device, according to an embodiment.

Referring to FIGS. 8E, 8F, 8G, and 8H, according to an embodiment, when an online encyclopedia search function is selected as the linked function, the electronic device 201*a* may provide an online encyclopedia search result value related to the text corresponding to the user input, as the content associated with the input text.

According to an embodiment, when an online encyclopedia search function is selected from among at least one linked function, a server of a specific website outside the electronic device 201*a* may be designated as the data provider 203. For example, when a specific website server is designated as the data provider 203, the designated specific website server may provide a result value searched using online encyclopedia data provided from the website server to the electronic device 201*a*.

Figure 8E:
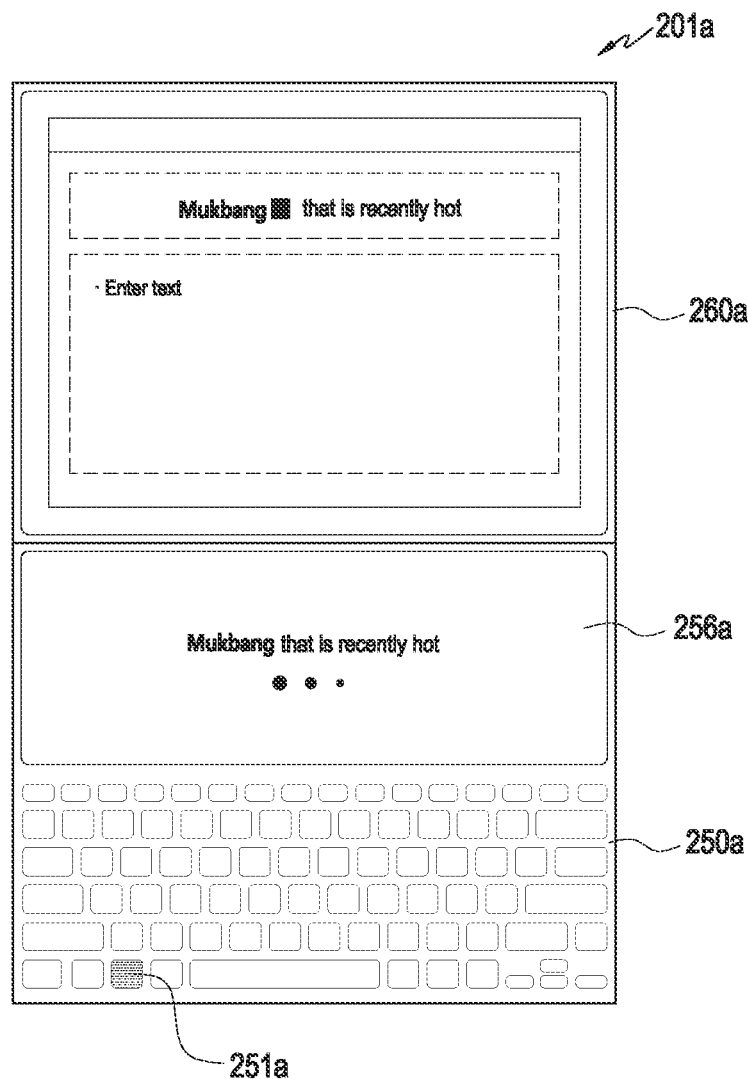
FIG. 8E is a view illustrating an example electronic device according to an embodiment.
Figure 8F:
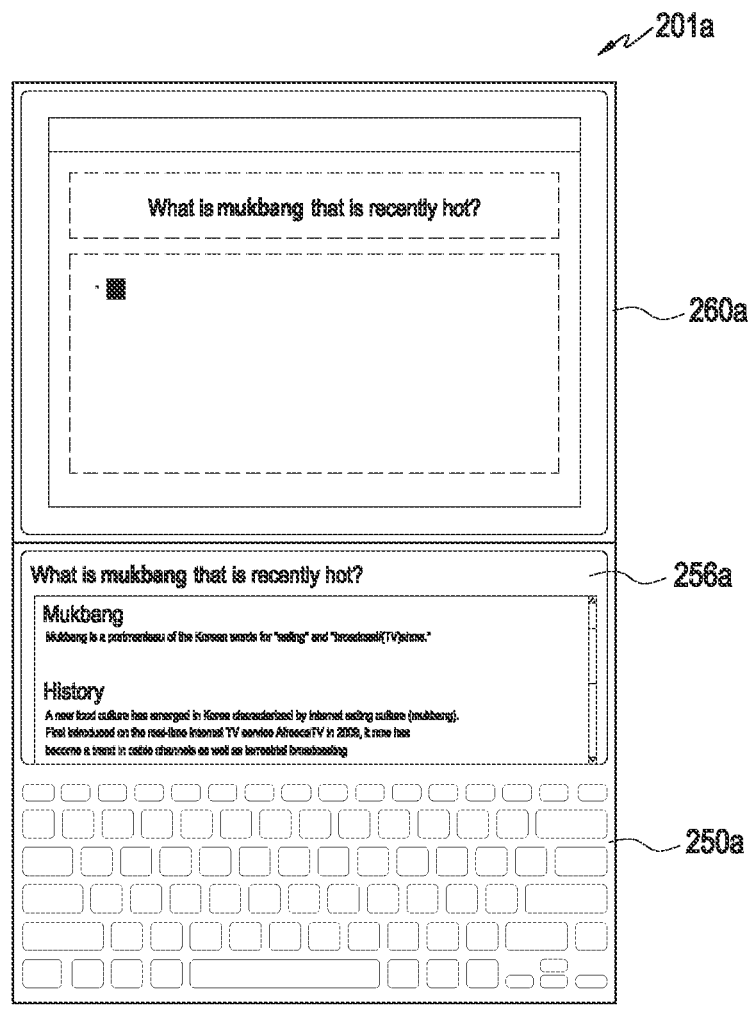
FIG. 8F is a view illustrating an example electronic device according to an embodiment.

For example, referring to FIGS. 8E and 8F, the electronic device 201*a* may identify input of text (e.g., "what is mukbang that is recently hot?") based on the user input. Referring to FIG. 8F, the electronic device 201*a* may receive information about content (e.g., online encyclopedia search result value related to "mukbang" which is a word included in the sentence "what is mukbang which is recently hot?") associated with the text identified based on the user input from the specific website server designated as the data provider 203 and display the received content on the touchscreen 256*a*.

Figure 8G:
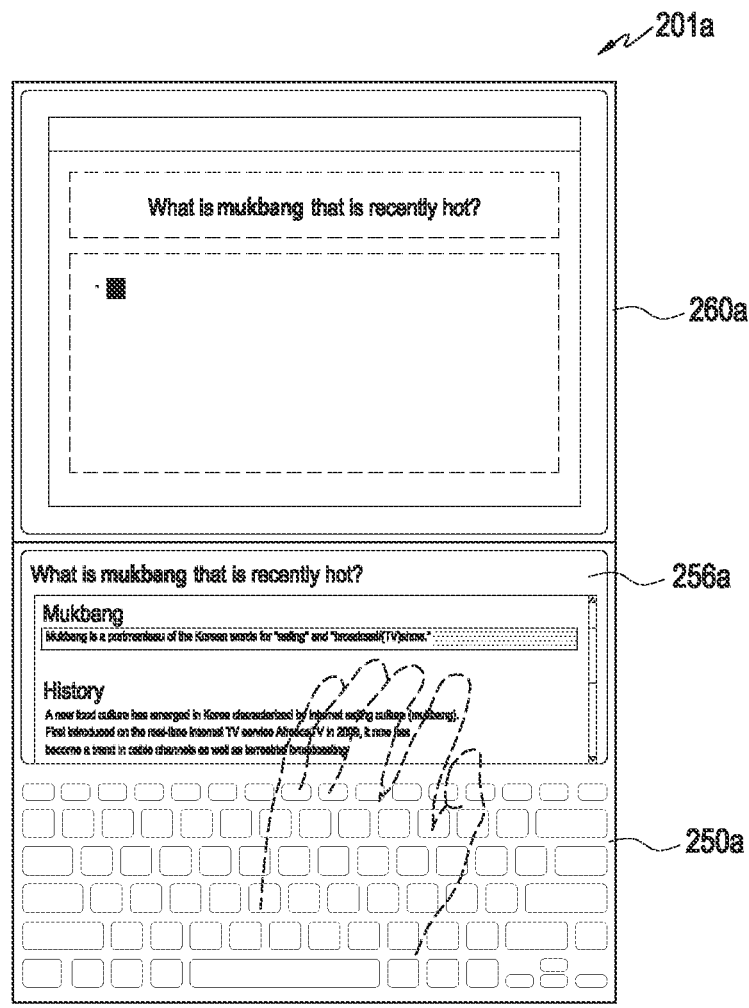
FIG. 8G is a view illustrating an example electronic device according to an embodiment.

According to an embodiment, referring to FIG. 8G, the electronic device 201*a* may display the online encyclopedia search result value associated with the text identified based on the user input on the touchscreen 256a, and the displayed online encyclopedia search result value may include the text, image, and/or URL link included in the online encyclopedia data. The user may make a touch input for selecting a specific area (e.g., a portion corresponding to a specific sentence among several sentences or a specific word) of the online encyclopedia search result value displayed on the touchscreen 256a or selecting a specific image or specific URL link.

For example, referring to FIG. 8G, the electronic device 201a may identify a touch input (e.g., a drag input from the end point of a specific sentence or specific word after making a long-press input to the start point of the specific sentence or specific word) for selecting the specific sentence or specific word displayed on the touchscreen 256a. Referring to FIG. 8G, when a specific sentence of the content displayed on the touchscreen 256a is selected by a touch input (e.g., long-press and then drag input), the electronic device 201a may display a highlight for emphasizing the selected specific sentence on the touchscreen 256a. The display of the highlight for emphasizing the selected specific sentence is by way of example, and the display method for emphasizing the specific area selected through the touch input is not limited.

Further, for example, referring to FIG. 8G, the electronic device 201a may identify the user's touch input (e.g., long-press input or tap input) for selecting a specific image or specific URL link displayed on the touchscreen 256a. For example, upon identifying a touch input (e.g., long-press input or tap input) to the specific URL link of the content displayed on the touchscreen 256a, the electronic device 201a may display an Internet page associated with the URL link on the touchscreen 256a. When the Internet page associated with the URL link is displayed on the touchscreen 256a, the user may make a touch input for selecting a partial area of the page.

Figure 8H:
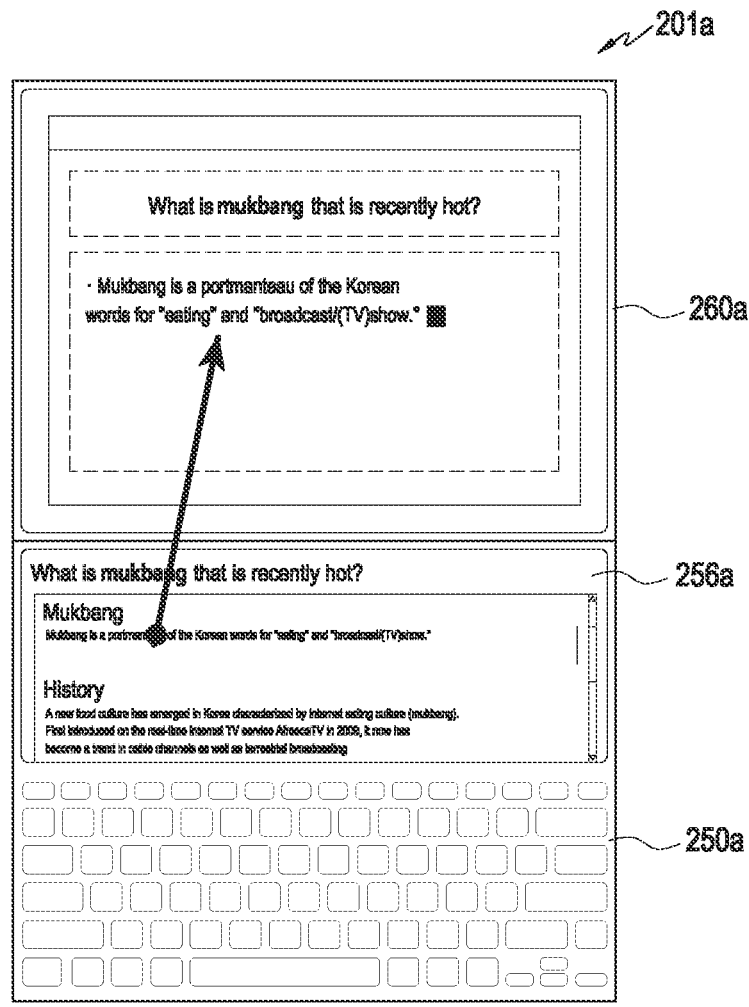
FIG. 8H is a view illustrating an example electronic device according to an embodiment.

According to an embodiment, referring to FIG. 8H, the electronic device 201a may display on display 260a the content (or a specific area (e.g., specific sentence or specific image) of the content) selected by the operation described in connection with FIG. 8G.

FIGS. 9A, 9B, 9C, and 9D are views illustrating an example electronic device according to an embodiment.

Referring to FIGS. 9A, 9B, 9C, and 9D, according to an embodiment, when a translation function is selected as the linked function, the electronic device 201a may provide text into which the text corresponding to a user input is translated in a specific language, as the content associated with the input text.

According to an embodiment, when a translation function is selected from among at least one linked function, a server of a specific website outside the electronic device 201a may be designated as the data provider 203. For example, when a specific website server is designated as the data provider 203, the designated specific website server may receive a query including text corresponding to the user input from the electronic device 201a and provide a value resultant from translating the input text in a specific language based on the received query to the electronic device 201a. Information about the specific language in which the input text is to be translated may be included in the query transmitted by the electronic device 201a.

According to an embodiment, when the translation function is selected from among at least one linked function, a specific application (e.g., translation application) executed on the electronic device 201a may be designated as the data provider 203. For example, the translation application designated as the data provider 203 may receive a query including text identified based on the user input and provide information including the text into which the input text is translated in the specific language using internal resources of the translation application to be used by the electronic device 201a. As another example, the translation application designated as the data provider 203 may receive a query including text identified based on the user input (FIG. 9A) and provide the information including the text into which the input text is translated in the specific language using communication with a cloud server present outside the electronic device 201a to be used by the electronic device 201a.

Figure 9A:
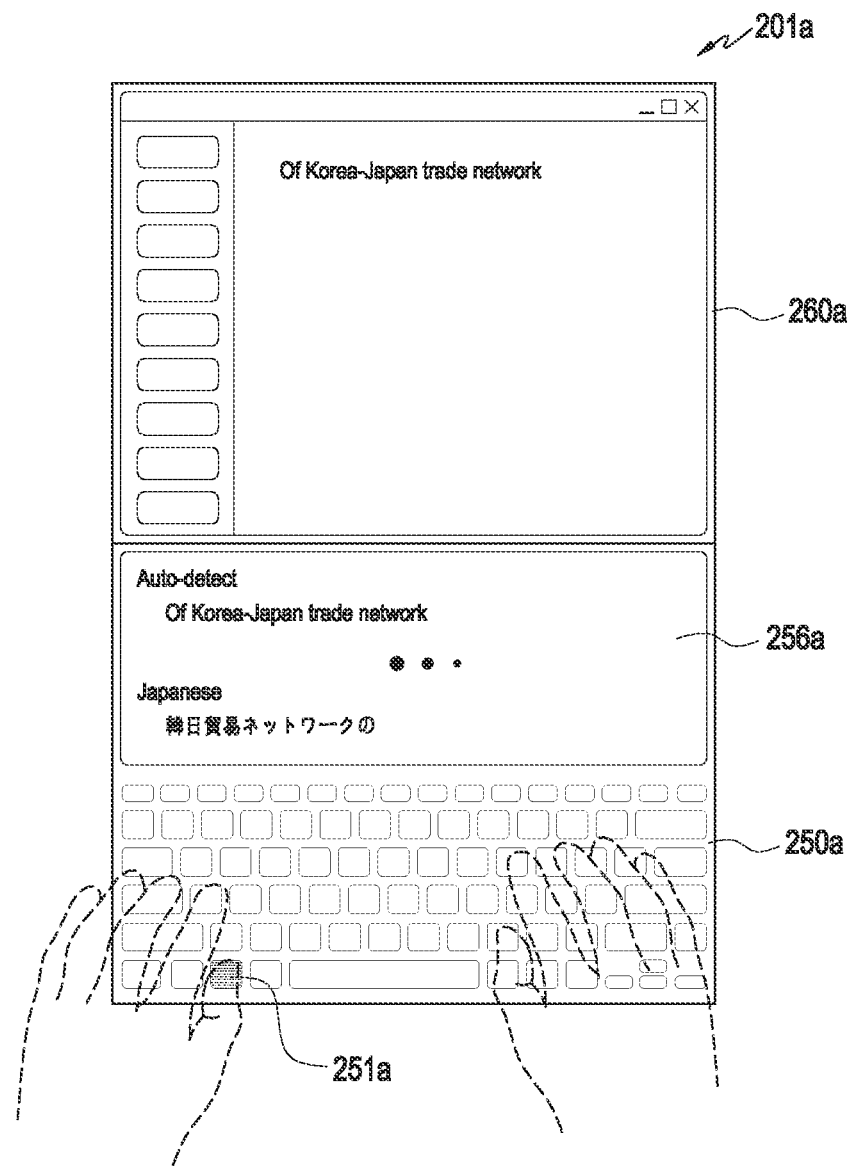
FIG. 9A is a view illustrating an example electronic device according to an embodiment.
Figure 9B:
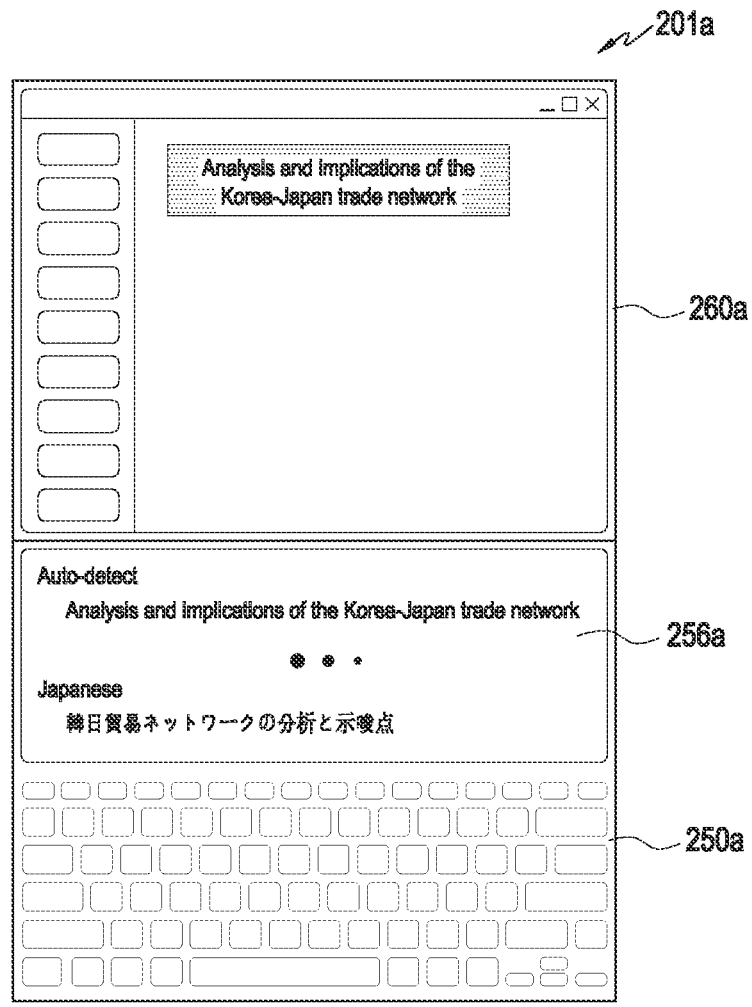
FIG. 9B is a view illustrating an example electronic device according to an embodiment.
Figure 9C:
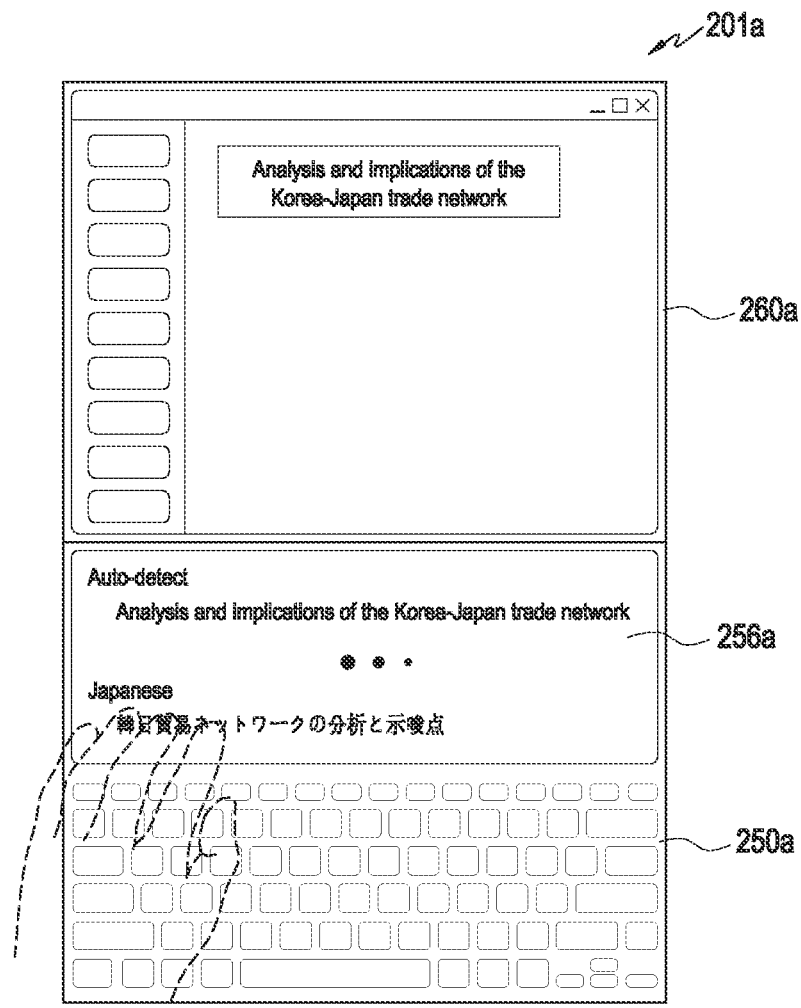
FIG. 9C is a view illustrating an example electronic device according to an embodiment.
Figure 9D:
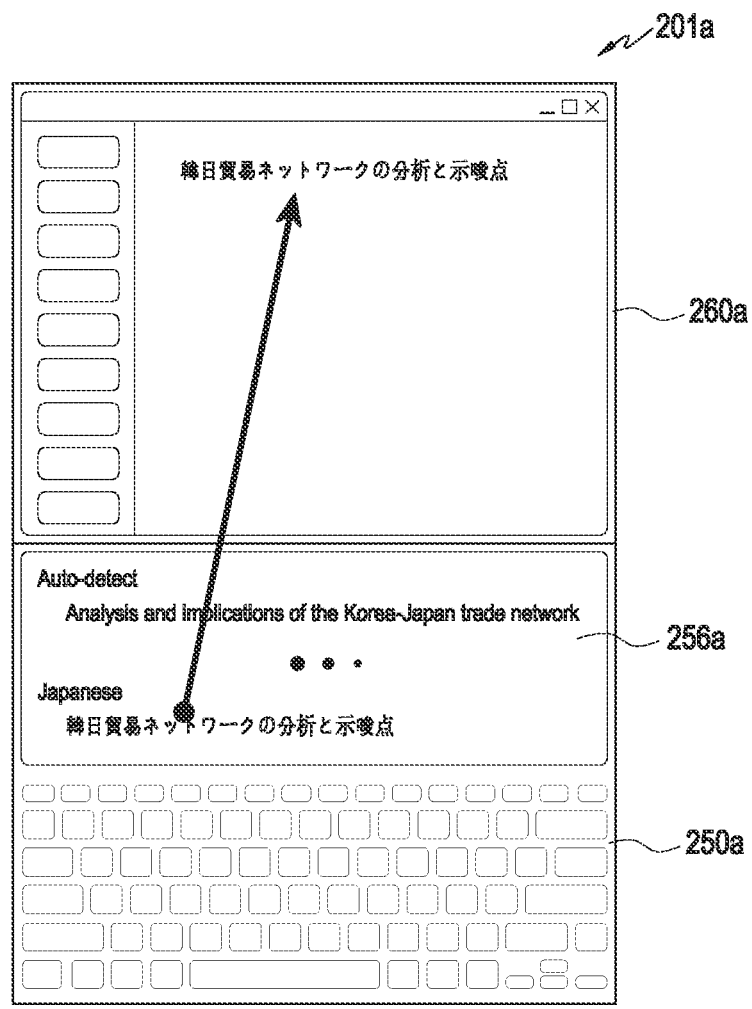
FIG. 9D is a view illustrating an example electronic device according to an embodiment.

For example, referring to FIG. 9B, the electronic device 201a may transmit a query including the text (e.g., "analysis and implications of the Korea-Japan trade network") corresponding to the user input to a specific website server designated as the data provider 203 or a specific application designated as the data provider 203 and receive information about the text (e.g., "韓日貿易ネットワクの分析と示唆点") translated into a specific language from the data provider 203 and display the received text on the touchscreen 256a. FIG. 9C. The user may select the received text and cause the received text to be displayed on display 260a.

FIGS. 10A, 10B, 10C, and 10D are views illustrating an example electronic device according to an embodiment.

Referring to FIGS. 10A, 10B, 10C, and 10D, according to an embodiment, when an image search function is selected as the linked function, the electronic device 201a may provide an image associated with the text corresponding to the user input, as the content associated with the input text.

According to an embodiment, when an image search function is selected from among at least one linked function, a server of a specific website outside the electronic device 201a may be designated as the data provider 203. For example, when a specific website server is designated as the data provider 203, the designated specific website server may receive a query including text corresponding to the user input from the electronic device 201a and provide a search result value of the image associated with the input text based on the received query to the electronic device 201a. In this case, the database used to search a designated specific website server for an image may be, for example, an entire database of the designated specific website server or a database configured by the user account of the electronic device 201a.

According to an embodiment, when the image search function is selected from among at least one linked function, a specific application (e.g., gallery application) executed on the electronic device 201a may be designated as the data provider 203. For example, the gallery application designated as the data provider 203 may receive a query including text identified based on the user input (FIG. 10A) and provide the search result value of the image associated with the input text using internal resources of the gallery application to be used by the electronic device 201a. As another example, the gallery application designated as the data provider 203 may receive a query including text identified based on the user input and provide the search result value of the image associated with the input text using communication with a cloud server present outside the electronic device 201a to be used by the electronic device 201a.

Figure 10A:
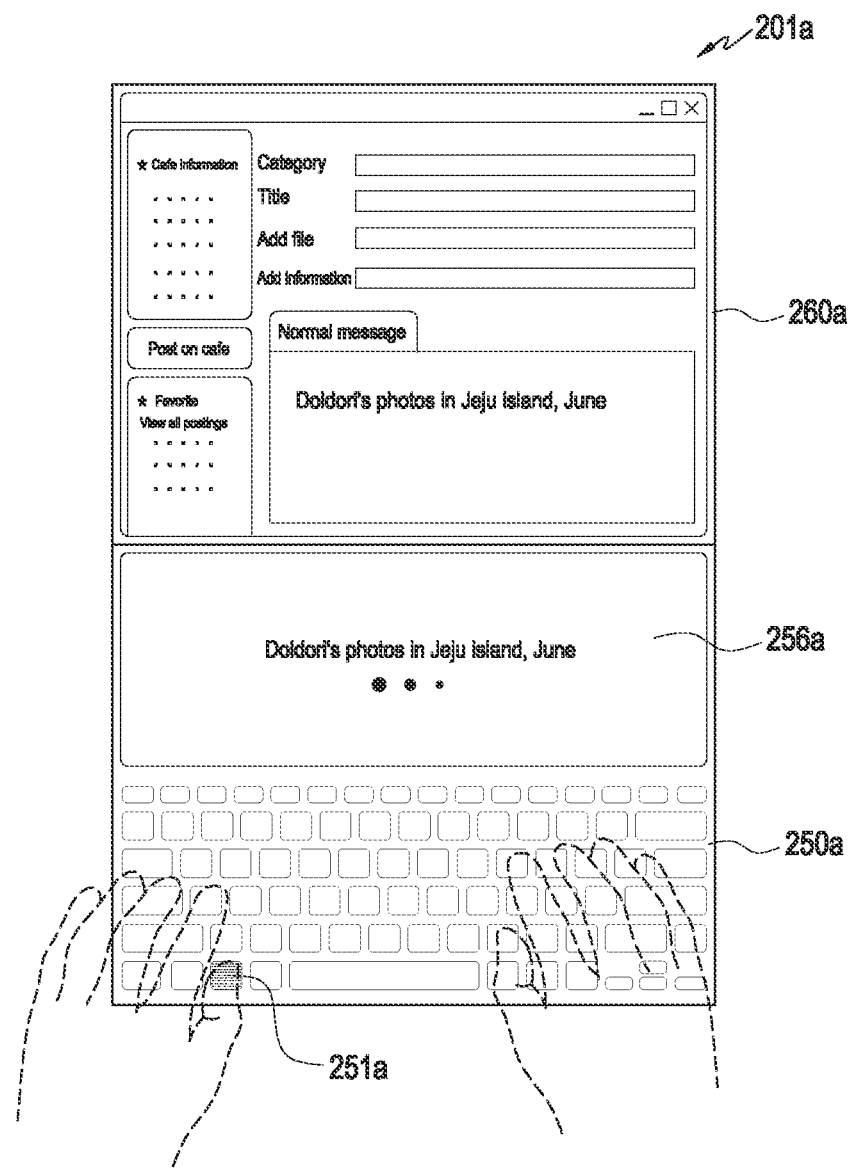
FIG. 10A is a view illustrating an example electronic device according to an embodiment.
Figure 10B:
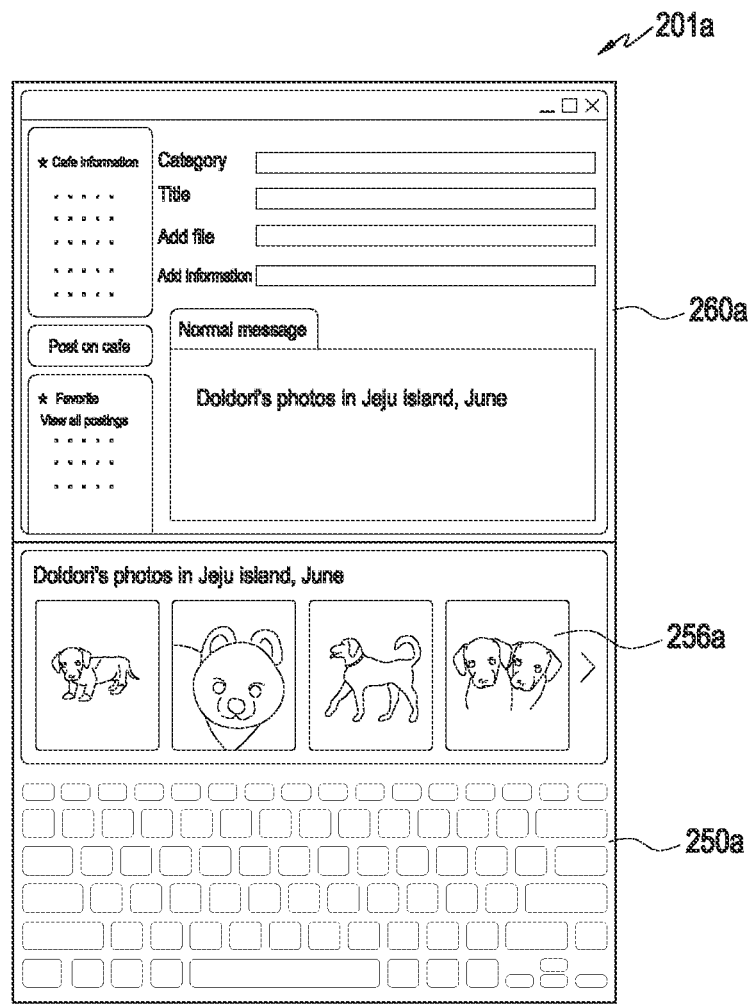
FIG. 10B is a view illustrating an example electronic device according to an embodiment.
Figure 10C:
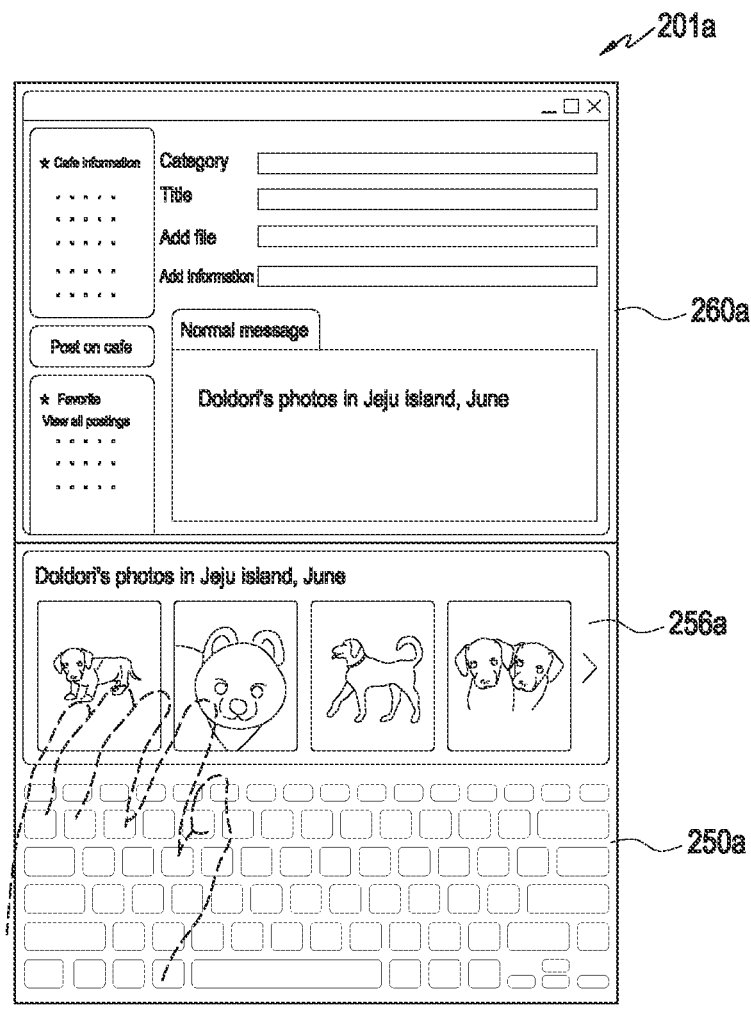
FIG. 10C is a view illustrating an example electronic device according to an embodiment.
Figure 10D:
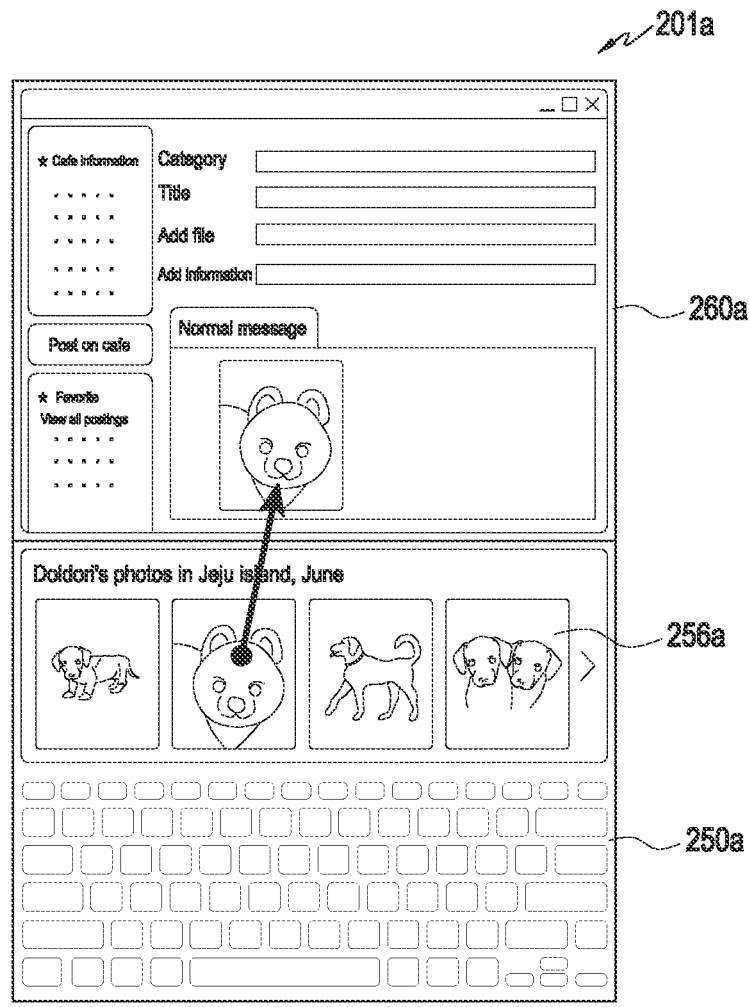
FIG. 10D is a view illustrating an example electronic device according to an embodiment.

For example, referring to FIG. 10B, the electronic device 201a may transmit a query including the text (e.g., "Doldori's photos in Jeju island, June") corresponding to the user input to a specific website server designated as the data provider 203 or a specific application designated as the data provider 203 and receive the search result value (e.g., at least one image associated with "Doldori's photos in Jeju island, June) from the data provider 203 and display the received at least one image on the touchscreen 256a. The user may select one of the images (FIG. 10C) and the selected image may be displayed on display 260a (FIG. 10D).

FIGS. 11A, 11B, 11C, and 11D are views illustrating an example electronic device according to an embodiment.

Referring to FIGS. 11A, 11B, 11C, and 11D, according to an embodiment, when an emoji function is selected as the linked function, the electronic device 201a may provide an emoticon, emoji, or graphics interchange format (GIF) associated with the text corresponding to the user input, as the content associated with the input text.

According to an embodiment, when an emoji function is selected from among at least one linked function, a server of a specific website outside the electronic device 201a may be designated as the data provider 203 as described above.

According to an embodiment, when the emoji function is selected from among at least one linked function, a specific application (e.g., input application) executed on the electronic device 201a may be designated as the data provider 203 as described above.

Figure 11A:
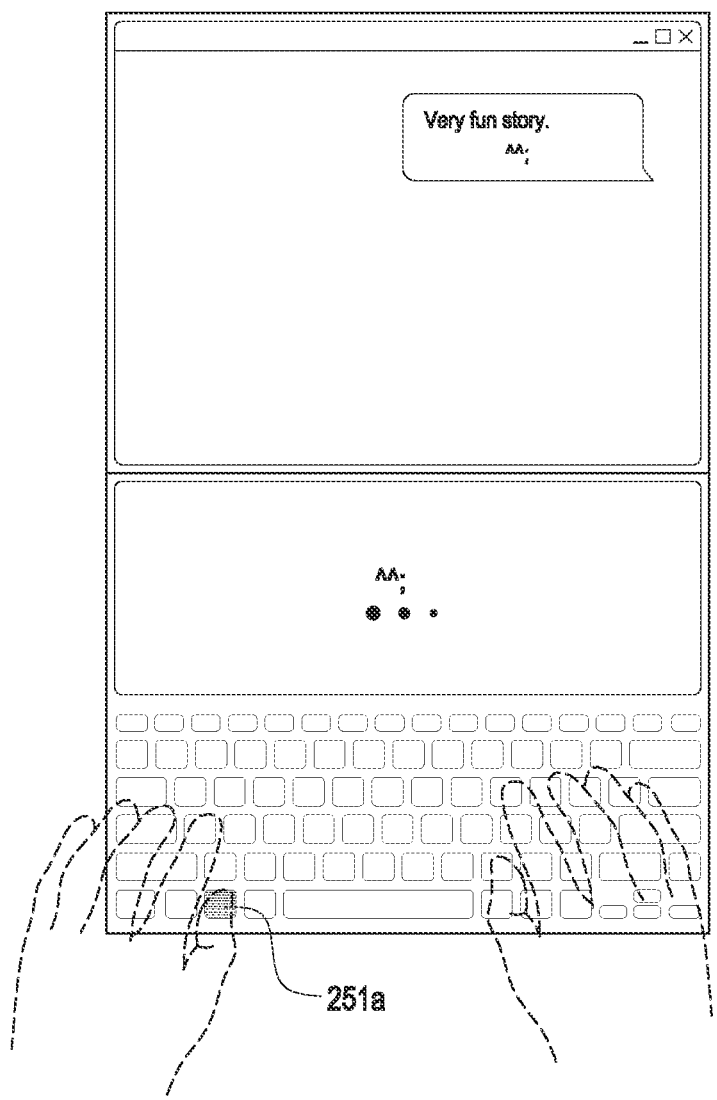
FIG. 11A is a view illustrating an example electronic device according to an embodiment.
Figure 11B:
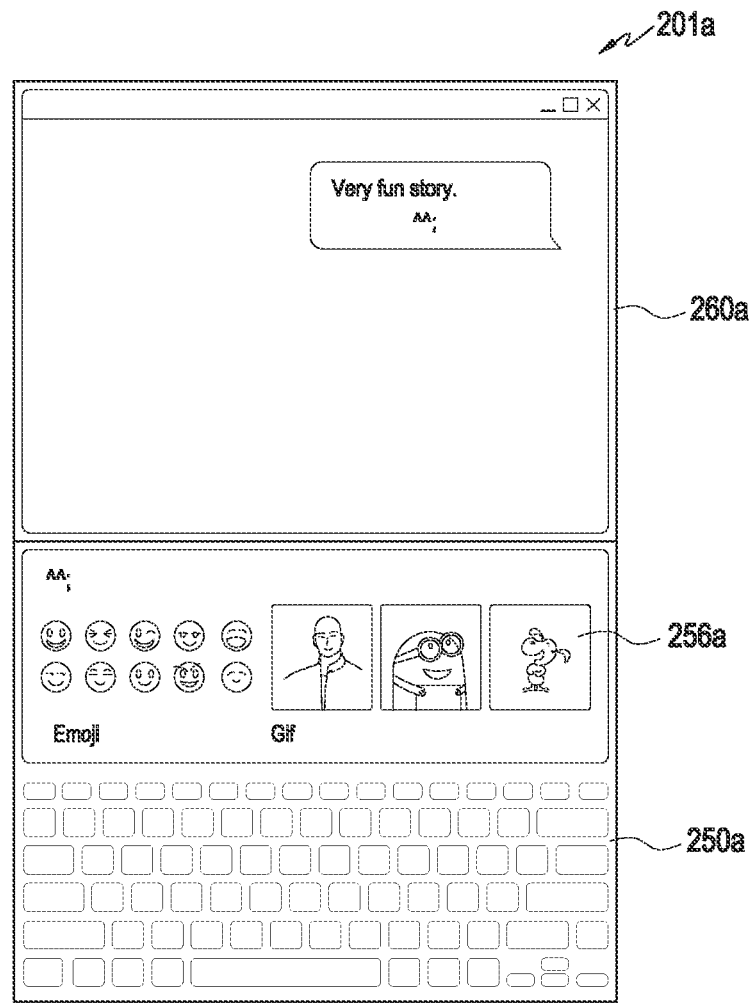
FIG. 11B is a view illustrating an example electronic device according to an embodiment.
Figure 11C:
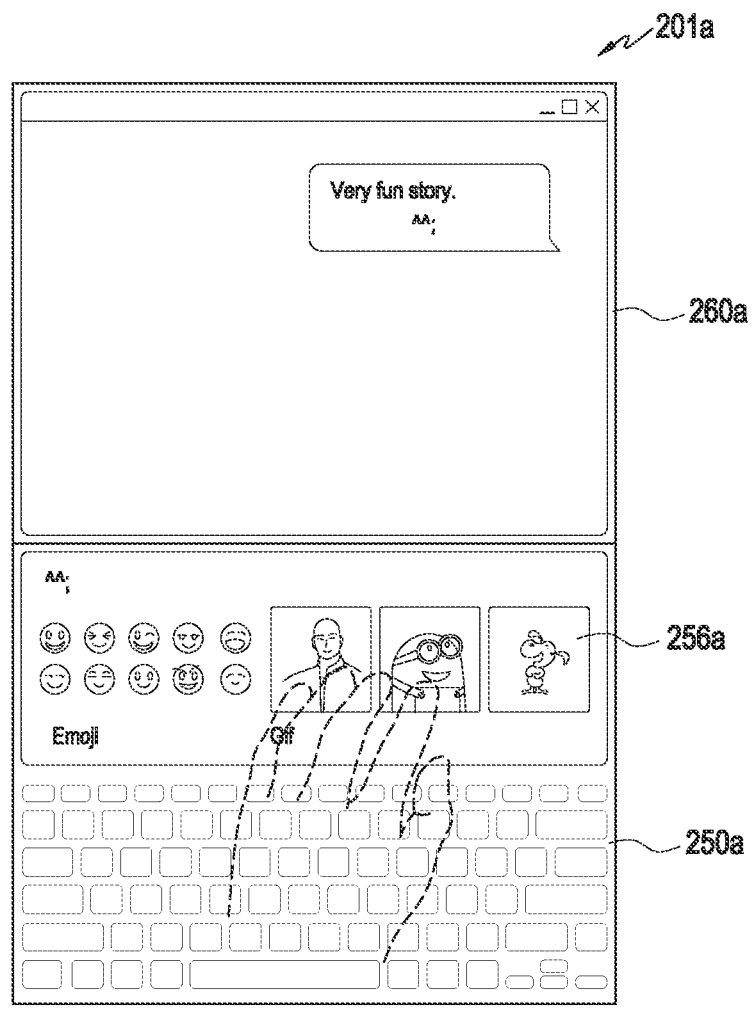
FIG. 11C is a view illustrating an example electronic device according to an embodiment.
Figure 11D:
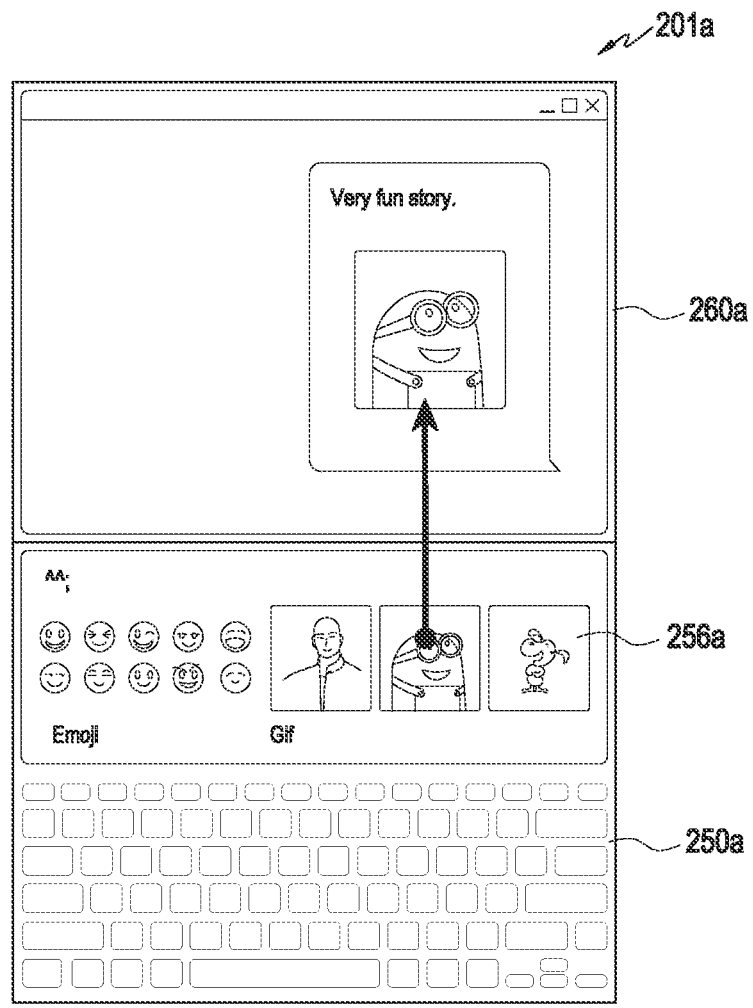
FIG. 11D is a view illustrating an example electronic device according to an embodiment.

For example, referring to FIG. 11B, the electronic device 201a may transmit a query including the text (e.g., "^^") (FIG. 11A) corresponding to the user input to a specific website server designated as the data provider 203 or a specific application designated as the data provider 203 and receive the search result value (e.g., the emoji or Gif shown in FIG. 11B) of the emoticon, emoji, or graphics interchange format (GIF) associated with the input text from the data provider 203 and display the received at least one result value on the touchscreen 256a. The user may select one of the emoticons, emojis or GIFs (FIG. 11C) and the selected emoticon, emoji, or GIF may be displayed on display 260a (FIG. 11D).

FIGS. 12A, 12B, 12C, and 12D are views illustrating an example electronic device according to an embodiment.

Referring to FIGS. 12A, 12B, 12C, and 12D, according to an embodiment, when a contact search function is selected as the linked function, the electronic device 201a may provide contact information associated with the text corresponding to the user input, as the content associated with the text.

According to an embodiment, when a contact search function is selected from among at least one linked function, a server of a specific website outside the electronic device 201a may be designated as the data provider 203 as described above.

According to an embodiment, when the contact search function is selected from among at least one linked function, a specific application (e.g., contact application) executed on the electronic device 201a may be designated as the data provider 203. For example, the contact application designated as the data provider 203 may receive a search result value of information about the contact associated with the input text, using the internal resources of the contact application, to be used by the electronic device 201a. As another example, the contact application designated as the data provider 203 may provide the search result value of the information about the contact associated with the input text using communication with a cloud server present outside the electronic device 201a to be used by the electronic device 201a.

Figure 12A:
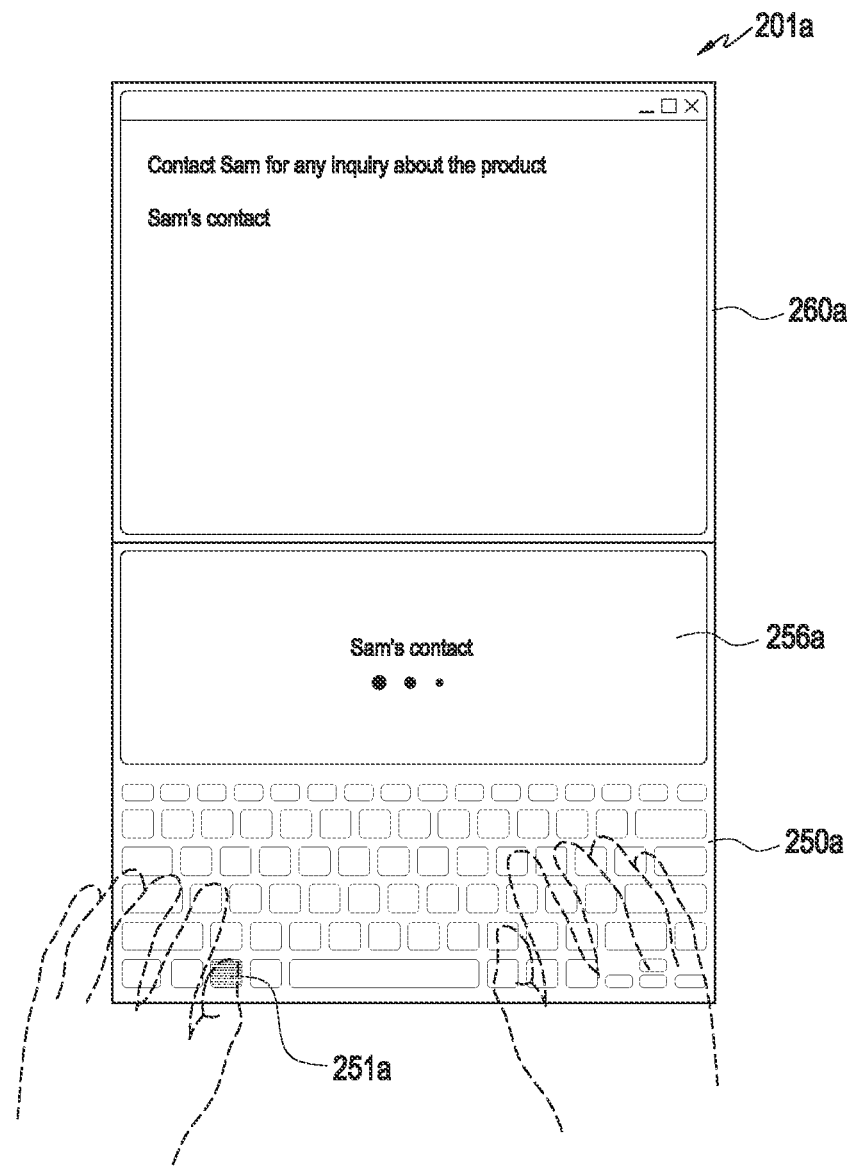
FIG. 12A is a view illustrating an example electronic device according to an embodiment.
Figure 12B:
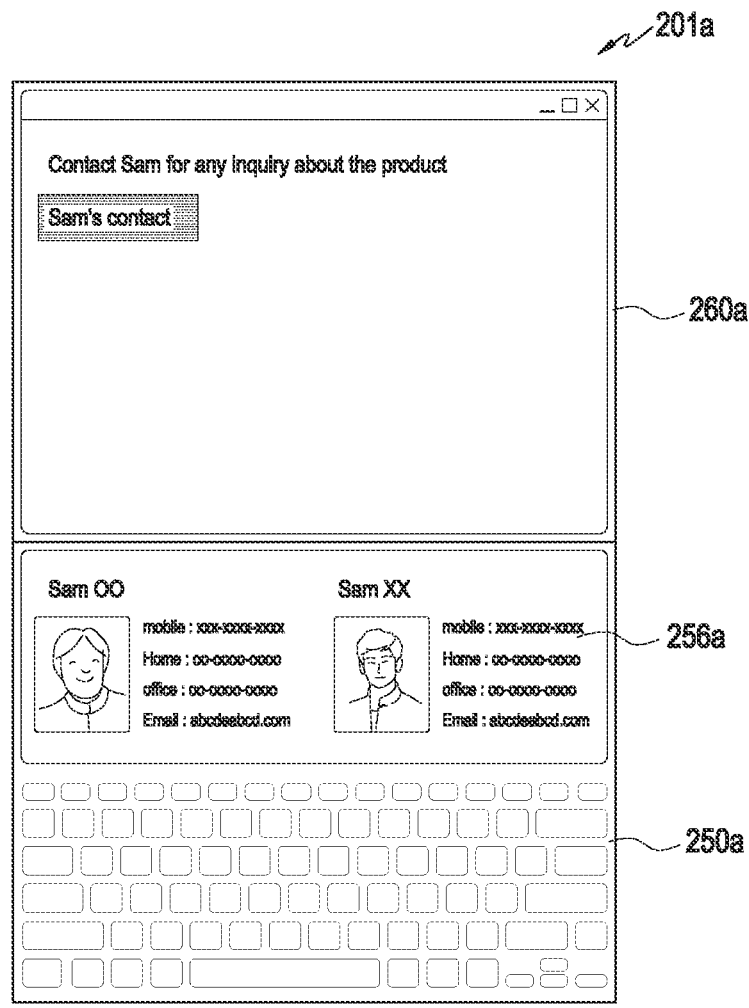
FIG. 12B is a view illustrating an example electronic device according to an embodiment.
Figure 12C:
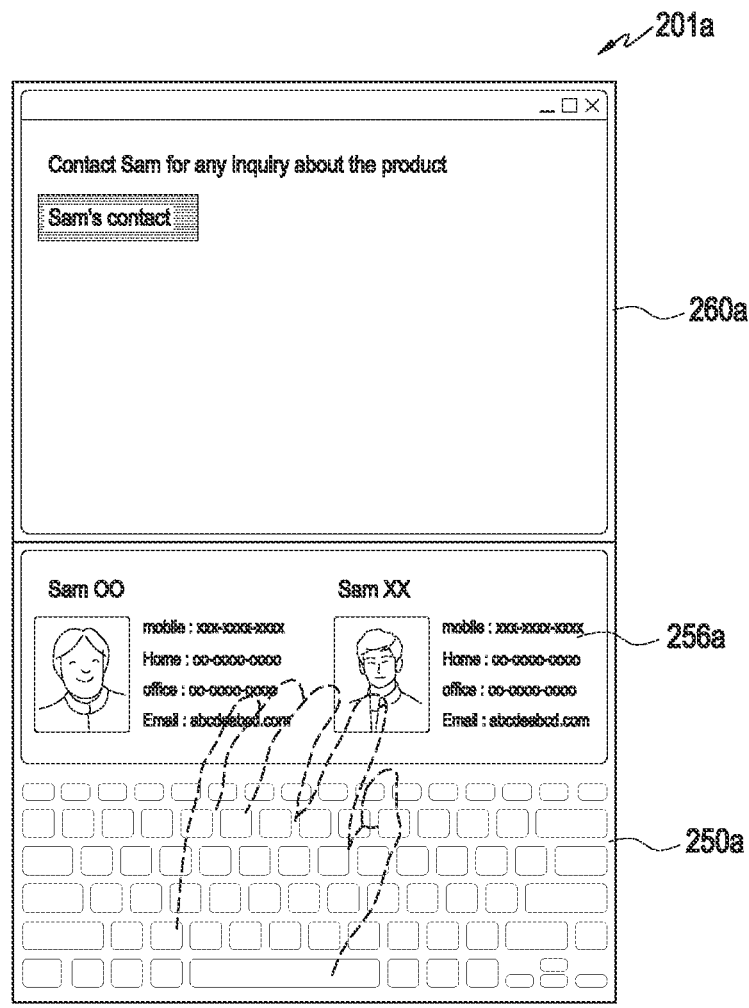
FIG. 12C is a view illustrating an example electronic device according to an embodiment.
Figure 12D:
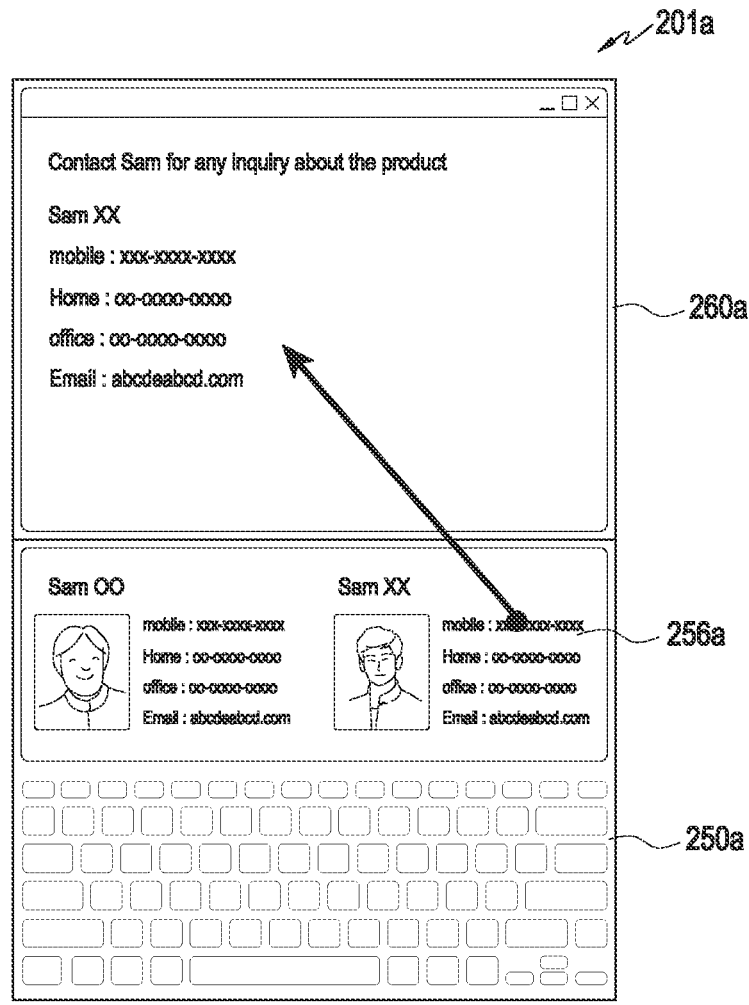
FIG. 12D is a view illustrating an example electronic device according to an embodiment.

For example, referring to FIG. 12B, the electronic device 201a may transmit a query including the text (e.g., "Sam's contact") corresponding to the user input (FIG. 12A) to a specific website server designated as the data provider 203 or a specific application designated as the data provider 203 and receive the search result value (e.g., cell phone number or email address) of the information about the contact associated with the input text from the data provider 203 and display the received contact information on the touchscreen 256a. The user may select one of the contacts (FIG. 12C) and the selected contact may be displayed on display 260a (FIG. 12D).

FIGS. 13A, 13B, 13C, and 13D are views illustrating an example electronic device according to an embodiment.

Referring to FIGS. 13A, 13B, 13C, and 13D, according to an embodiment, when a macro function is selected as the linked function, the electronic device 201a may provide a macro predefined in association with specific text. The type of the macro predefined in association with the specific text is not limited, and the electronic device 201a may use a macro defined by the user or a macro predefined by a specific application executed on the electronic device 201a. For example, the macro may be (1) the operation of outputting a predefined specific sentence corresponding to specific text input when the specific text is input or a result value of the operation or (2) the operation of outputting a value resultant from performing a predefined specific operation corresponding to specific text when the specific text is input or a result value of the operation.

Figure 13A:
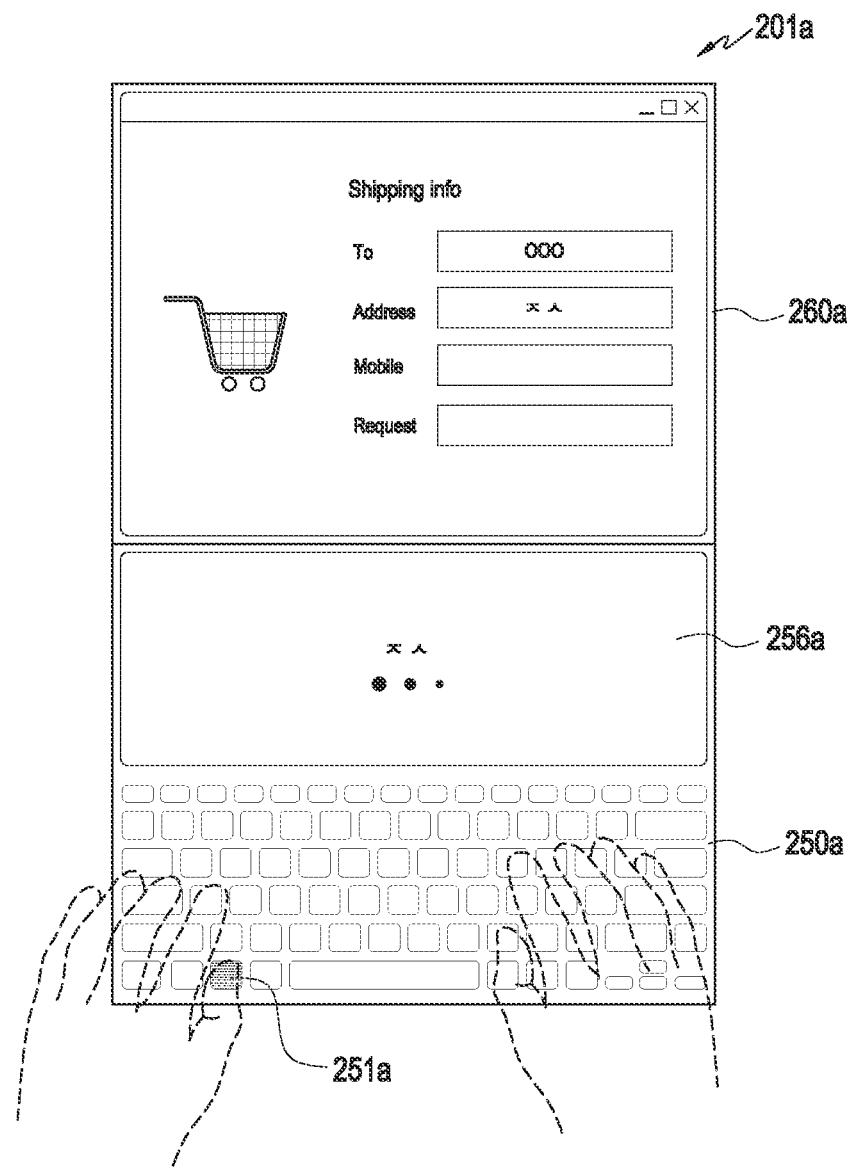
FIG. 13A is a view illustrating an example electronic device according to an embodiment.
Figure 13B:
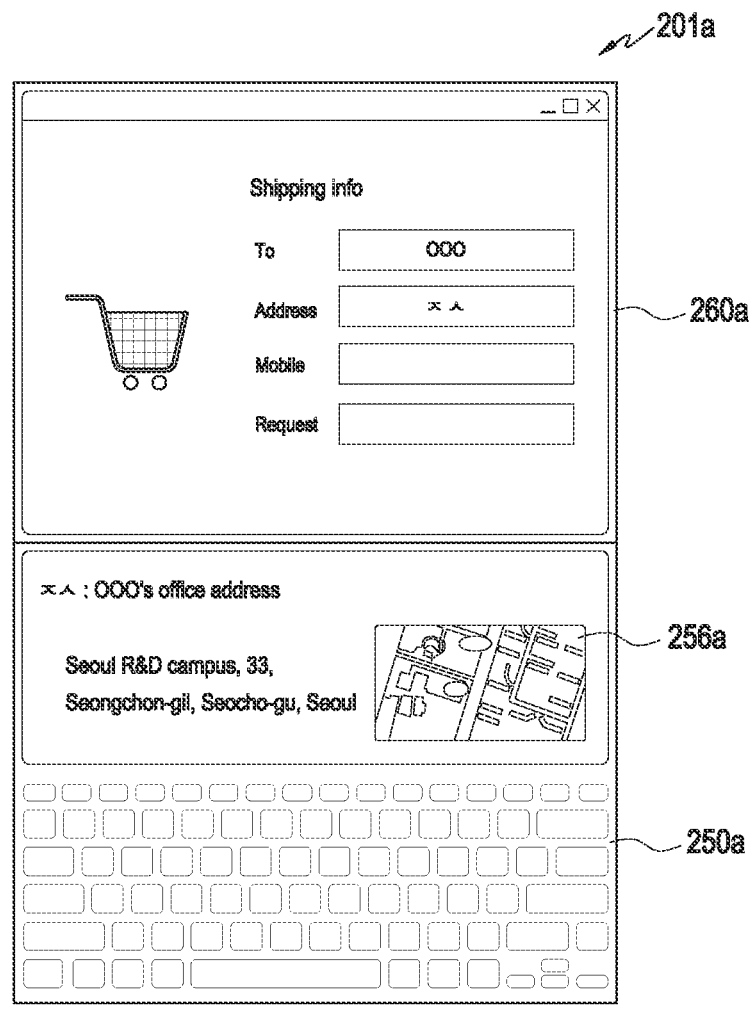
FIG. 13B is a view illustrating an example electronic device according to an embodiment.
Figure 13C:
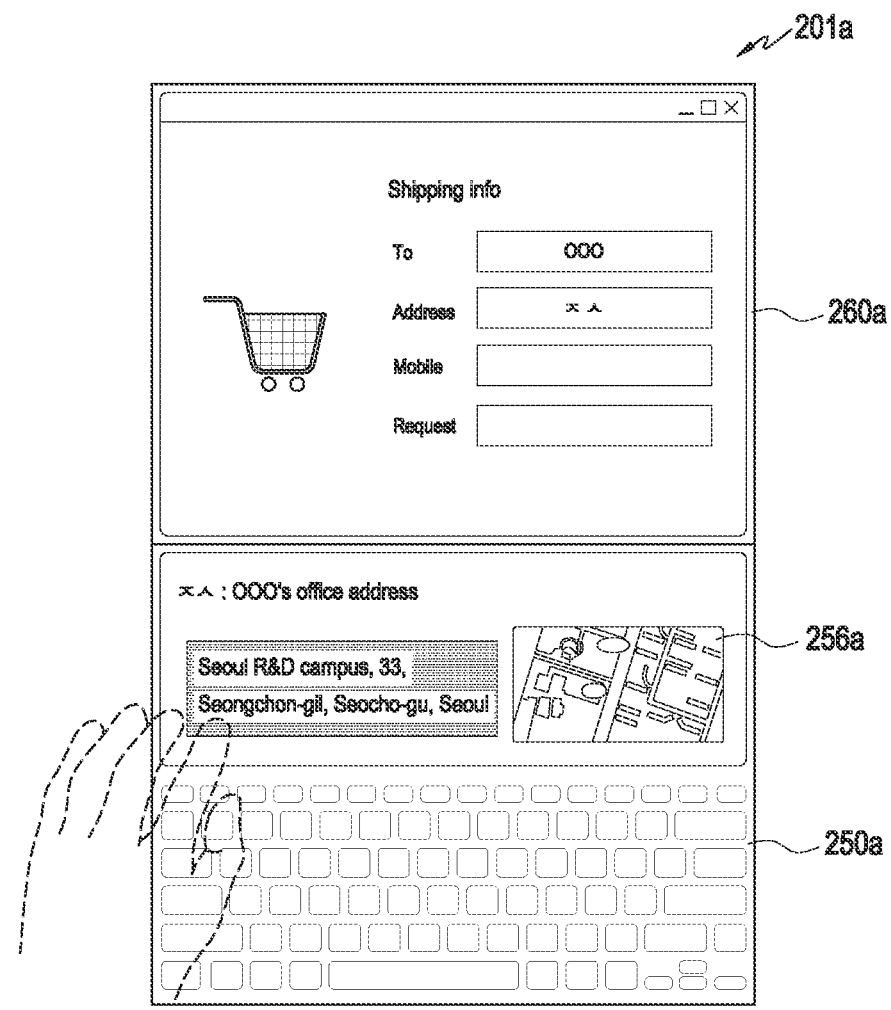
FIG. 13C is a view illustrating an example electronic device according to an embodiment.
Figure 13D:
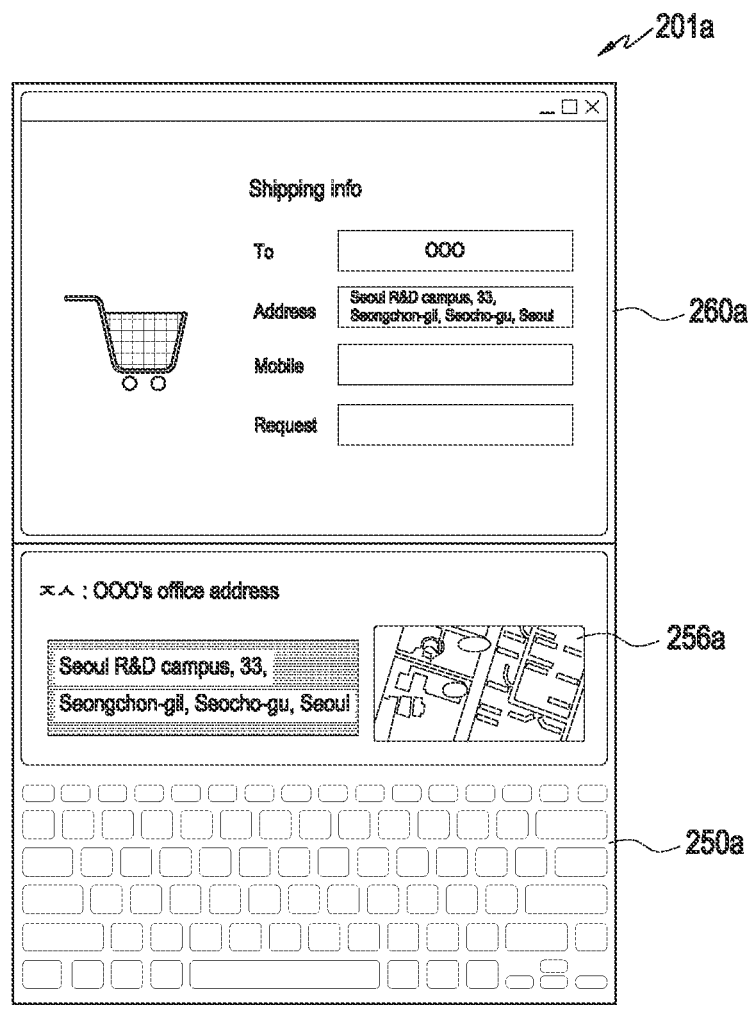
FIG. 13D is a view illustrating an example electronic device according to an embodiment.

According to an embodiment, when the macro function is selected from among at least one linked function, a specific application executed on the electronic device 201a may be designated as the data provider 203. For example, referring to FIG. 13B, the electronic device 201a may receive information about a specific sentence (e.g., "Office address, Umyeon-dong Seoul R&D campus, 33, Seongchon-gil, Seocho-gu, Seoul") predefined in association with specific text (e.g., "ㅈㅅ") identified based on a user input (FIG. 13A) from the specific application designated as the data provider 203 and display the received specific sentence on the touchscreen 256a. The user may select the specific sentence (FIG. 13C) and the specific sentence may be displayed on display 260a (FIG. 13D).

FIGS. 14, 15, 16, and 17 are flowcharts illustrating an embodiment in which the input device 201b of FIG. 2B plays a role as the touchscreen 256a and keyboard-type input device 250a of the electronic device 201a of FIG. 2A. Referring to FIG. 2B, FIGS. 14, 15, 16, and 17 are described. The input device 201b may be the same type of device as the electronic device 101 of FIG. 1.

Figure 14:
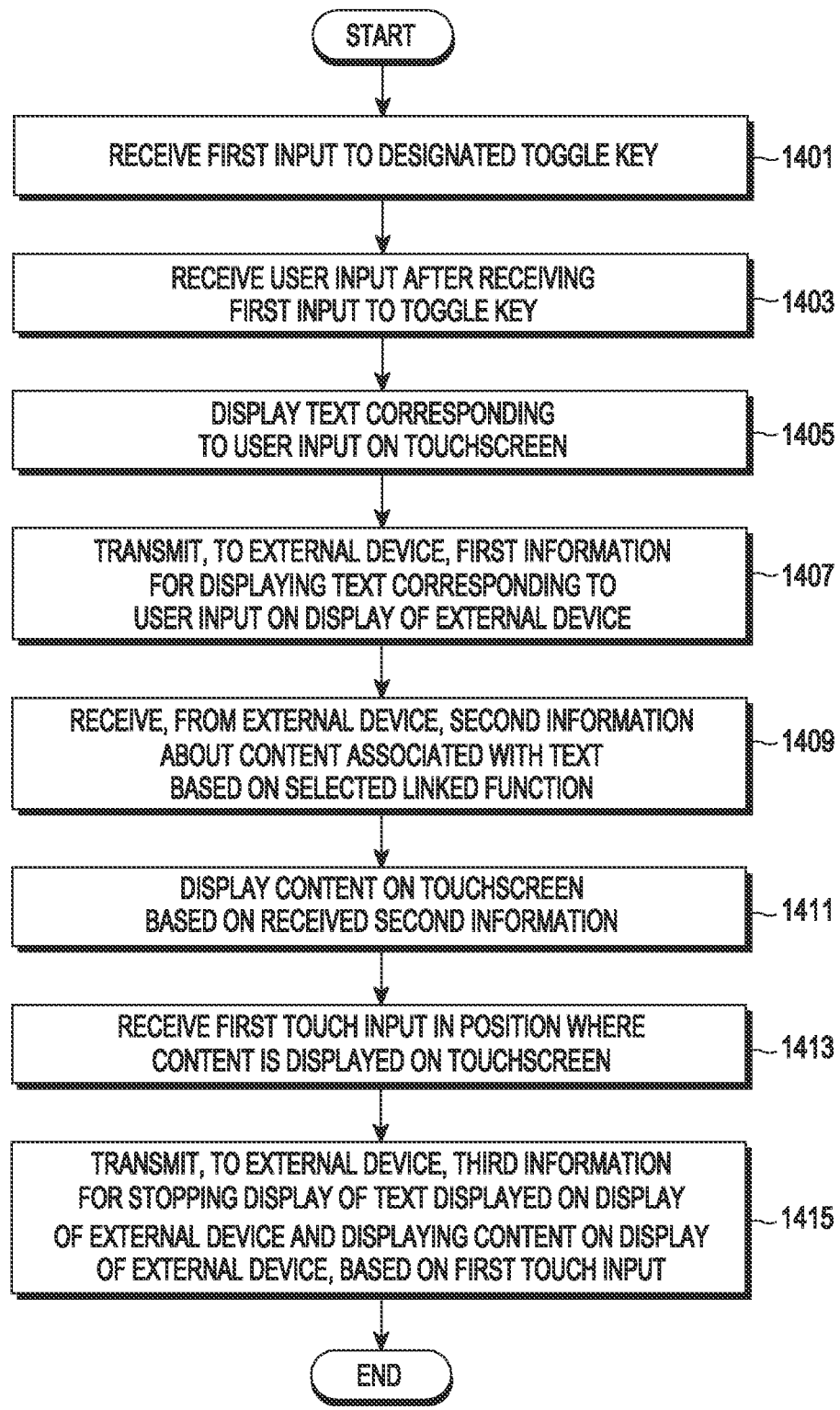
FIG. 14 is a flowchart illustrating an example operation method of an input device according to an embodiment.

FIG. 14 is a flowchart illustrating an example operation method of an input device according to an embodiment.

Referring to FIG. 14, in operation 1401, according to an embodiment, the input device 201b (e.g., the processor 120) may receive an input (e.g., first input) to a designated toggle key 251b included in the keyboard-type input device 250b.

In operation 1403, according to an embodiment, the input device 201b may receive a user input through the keyboard-type input device 250b after receiving the input (e.g., first input) to the toggle key 251b.

In operation 1405, according to an embodiment, the input device 201b may display text corresponding to the received user input on the touchscreen 256b.

In operation 1407, according to an embodiment, the input device 201b may transmit first information for displaying the text corresponding to the user input on the display (e.g., the display 260b) of an external device (e.g., the output device 202b) to the external device (e.g., the output device 202b). For example, the input device 201b may transmit, to the output device 202b, data including the text identified based on the user input, using a communication module (e.g., the communication module 190).

In operation 1409, according to an embodiment, the input device 201b may receive second information about the content associated with the text from the output device 202b based on a selected linked function. For example, the output device 202b may perform communication with the data provider 203 outside the output device 202b and transmit information about the content received from the data provider 203 to the input device 201b. As another example, the output device 202b may transmit, to the input device 201b, information about the content received from the data provider 203 (e.g., specific application executed on the output device 202b) inside the output device 202b.

According to an embodiment, unlike in operation 1409, the input device 201b may provide a query including the input text to the data provider 203 outside the input device 201b or the data provider 203 (e.g., the specific application executed on the input device 201b) inside the input device 201b and directly receive information about the content associated with the text from the data provider 203.

In operation 1411, according to an embodiment, the input device 201b may display the content associated with the text on the touchscreen 256b based on the received content information. For example, the input device 201b may display content on the touchscreen 256b based on the second information about the content received from the output device 202b.

According to an embodiment, unlike in operation 1411, the input device 201b may display the content associated with the text on the touchscreen 256b based on the content information directly received from the data provider 203.

In operation 1413, according to an embodiment, the input device 201b may receive a touch input (e.g., first touch input) at the position where content is displayed on the touchscreen 256b.

In operation 1415, according to an embodiment, the input device 201b may transmit, to the output device 202b, third information for stopping the display of the text displayed on the display 260b of the output device 202b and displaying the content associated with the text on the display 260b of the output device 202b, based on the touch input (e.g., first touch input) at the position where content is displayed on the touchscreen 256b.

Figure 15:
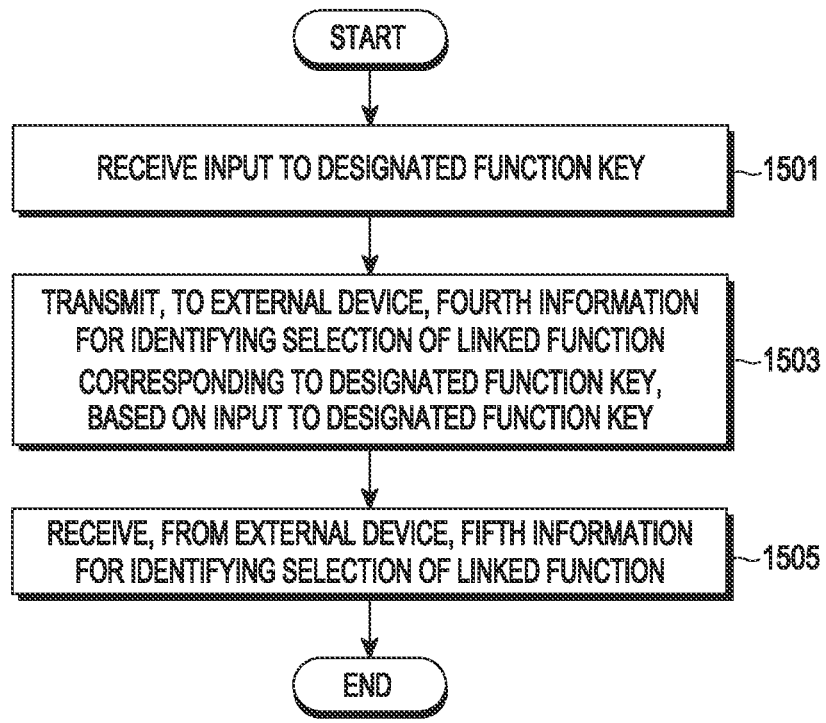
FIG. 15 is a flowchart illustrating an example operation method of an input device according to an embodiment.

FIG. 15 is a flowchart illustrating an example operation method of an input device according to an embodiment.

Referring to FIG. 15, in operation 1501, according to an embodiment, the input device 201b (e.g., the processor 120) may receive an input to a designated function key 253b included in the keyboard-type input device 250b.

In operation 1503, according to an embodiment, the input device 201b may transmit, to the external device (e.g., the output device 202b), fourth information for identifying selection of a linked function corresponding to the designated function key 253b, based on the input to the designated function key 253b. The output device 202b may identify selection of the linked function corresponding to the designated function key 253b based on the fourth information received from the input device 201b.

In operation 1505, according to an embodiment, the input device 201b may receive fifth information for identifying selection of the linked function from the output device 202b. For example, the input device 201b may identify selection of the linked function corresponding to the designated function key 253b based on the fifth information received from the output device 202b.

According to an embodiment, unlike in operations 1503 and 1505, the input device 201b may directly identify selection of the linked function corresponding to the designated function key 253b based on an input to the designated function key 253b. The keyboard-type input device 250b of the input device 201b may include a plurality of function keys 253b or may include a single function key 253b, and the method for identifying selection of a linked function based on an input to the function key 253b has been described above.

Figure 16:
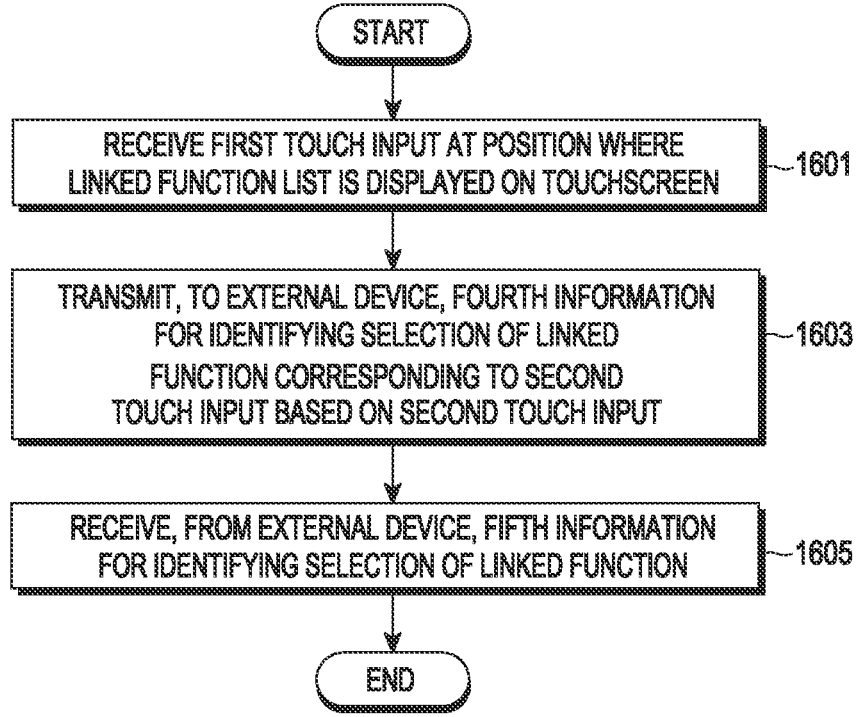
FIG. 16 is a flowchart illustrating an example operation method of an input device according to an embodiment.

FIG. 16 is a flowchart illustrating an example operation method of an input device according to an embodiment.

Referring to FIG. 16, in operation 1601, according to an embodiment, the input device 201b (e.g., the processor 120) may receive a touch input (e.g., second touch input) at the position where the linked function list is displayed on the touchscreen 256b.

In operation 1603, according to an embodiment, the input device 201b may transmit, to the external device (e.g., the output device 202b), fourth information for identifying selection of the linked function corresponding to the touch input, based on the touch input (e.g., second touch input) at the position where the linked function list is displayed on the touchscreen 256b.

In operation 1605, according to an embodiment, the input device 201b may receive fifth information for identifying selection of the linked function from the output device 202b. For example, the input device 201b may identify selection of the linked function corresponding to the touch input (e.g., second touch input) based on the fifth information received from the output device 202b.

According to an embodiment, unlike in operations 1603 and 1605, the input device 201b may directly identify selection of the linked function corresponding to the touch input (e.g., second touch input) based on the touch input (e.g., second touch input) in the position where the linked function list is displayed on the touchscreen 256b.

Figure 17:
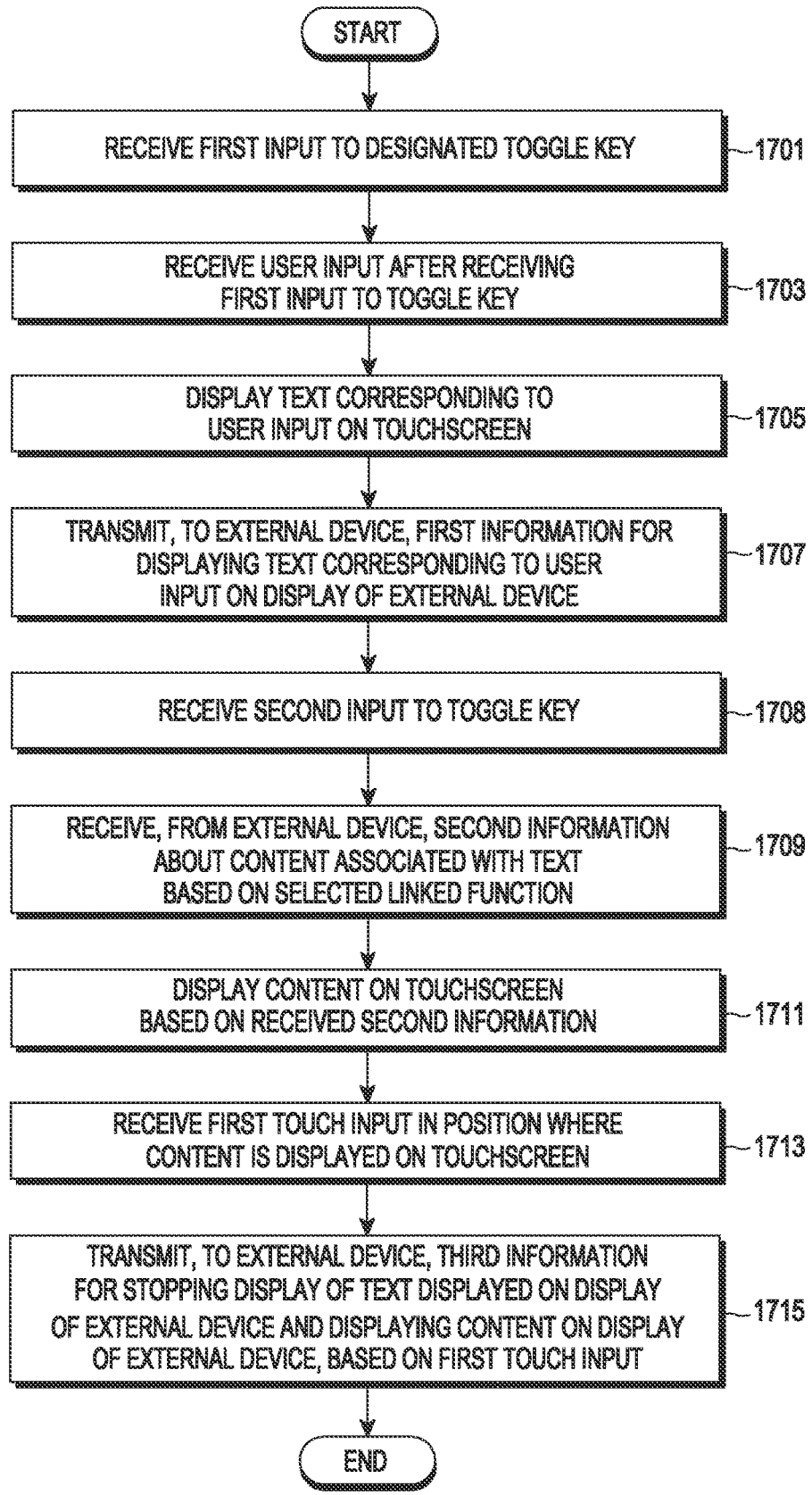
FIG. 17 is a flowchart illustrating an example operation method of an input device according to an embodiment.

FIG. 17 is a flowchart illustrating an example operation method of an input device according to an embodiment.

Referring to FIG. 17, in operation 1701, according to an embodiment, the input device 201b (e.g., the processor 120) may receive an input (e.g., first input) to a designated toggle key 251b included in the keyboard-type input device 250b.

In operation 1703, according to an embodiment, the input device 201b may receive a user input through the keyboard-type input device 250b after receiving the first input to the toggle key 251b.

In operation 1705, according to an embodiment, the input device 201b may display text corresponding to the received user input on the touchscreen 256b.

In operation 1707, according to an embodiment, the input device 201b may transmit first information for displaying the text corresponding to the user input on the display 260b of an external device (e.g., the output device 202b) to the external device (e.g., the output device 202b).

In operation 1708, according to an embodiment, the input device 201b may receive an input (e.g., second input) to a designated toggle key 251b included in the keyboard-type input device 250b. For example, the input device 201b may receive a second input to the toggle key 251b after receiving the first input to the toggle key 251b.

In operation 1709, according to an embodiment, the input device 201b may receive second information about the content associated with the text from the output device 202b based on a selected linked function, in response to reception of the second input to the designated toggle key 251b.

According to an embodiment, unlike in operation 1709, the input device 201b may directly receive information about the content associated with the text from the data provider 203, based on reception of the input (e.g., second input) to the designated toggle key 251b.

In operation 1711, according to an embodiment, the input device 201b may display the content associated with the text on the touchscreen 256b based on the received content information. For example, the input device 201b may display content on the touchscreen 256b based on the second information about the content received from the output device 202b.

According to an embodiment, unlike in operation 1711, the input device 201b may display the content on the touchscreen 256b based on the content information directly received from the data provider 203.

According to an embodiment, operations 1713 and 1715 may be understood similarly to operations 1413 and 1415.

FIGS. 18, 19, 20, 21, and 22 are flowcharts illustrating an embodiment in which the output device 202b of FIG. 2B plays a role as the display 260a of the electronic device 201a of FIG. 2A. Referring to FIG. 2B, FIGS. 18, 19, 20, 21, and 22 are described. The output device 202b may be the same type of device as the electronic device 101 of FIG. 1.

Figure 18:
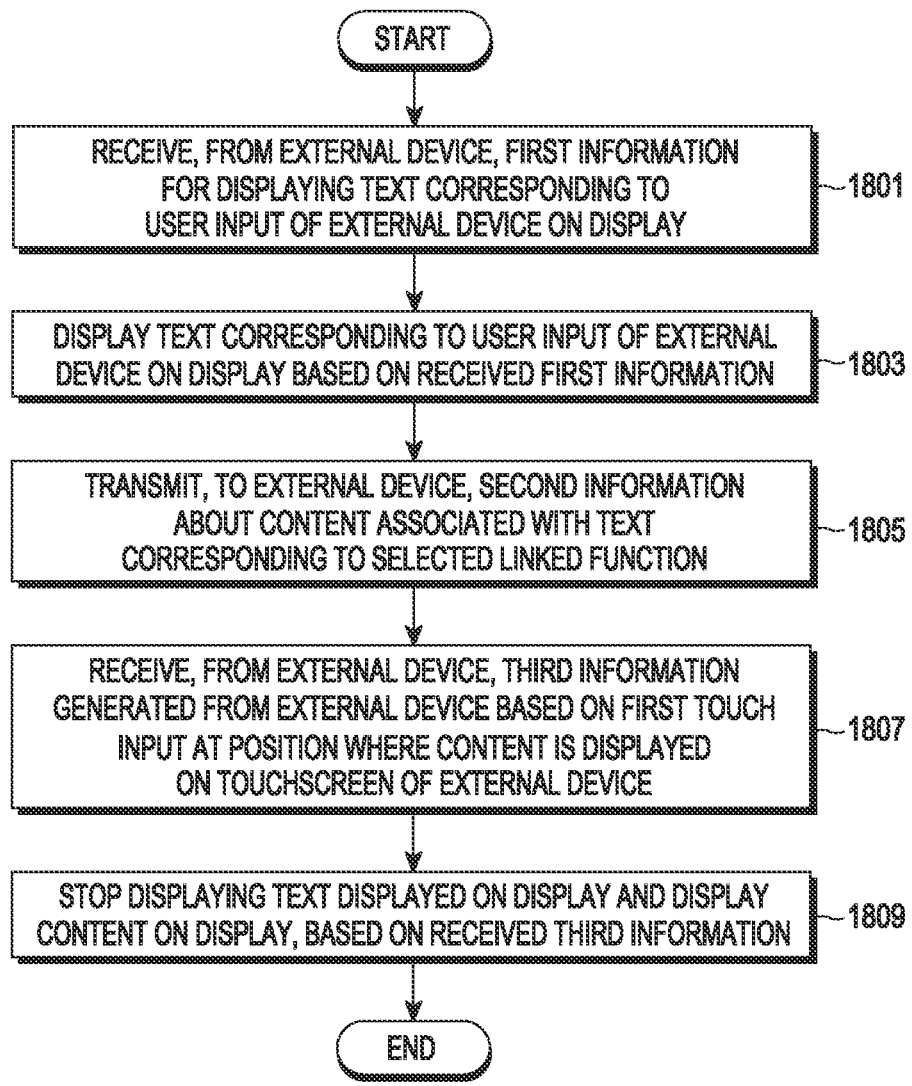
FIG. 18 is a flowchart illustrating an example operation method of an output device according to an embodiment.

FIG. 18 is a flowchart illustrating an example operation method of an output device according to an embodiment.

Referring to FIG. 18, in operation 1801, according to an embodiment, the output device 202b (e.g., the processor 120) may receive information from an external device (e.g., the input device 201b). For example, the output device 202b may receive first information for displaying the text corresponding to a user input to the input device 201b on the display 260b of the output device 202b, from the input device 201b.

In operation 1803, according to an embodiment, the output device 202b may display the text corresponding to the user input of the input device 201b on the display 260b of the output device 202b, based on the first information received from the input device 201b.

In operation 1805, according to an embodiment, the output device 202b may transmit second information about content associated with the text to the input device 201b, based on a selected linked function.

According to an embodiment, unlike in operation 1805, the output device 202b may not perform the operation of transmitting the second information about the content associated with the text to the input device 201b.

In operation 1807, according to an embodiment, the output device 202b may receive, from the input device 201b, third information generated by the input device 201b based on the first touch input at the position where content is displayed on the touchscreen 256b of the input device 201b. For example, the third information received from the input device 201b may include information for identifying that specific content among at least one content displayed on the touchscreen 256b of the input device 201b is selected.

In operation 1809, according to an embodiment, the output device 202b may stop displaying the text displayed on the display 260b of the output device 202b or display the content associated with the text on the display 260b of the output device 202b, based on the received third information.

According to an embodiment, unlike in operation 1809, the output device 202b may keep displaying the text displayed on the display 260b of the output device 202b while displaying the content associated with the text on the display 260b of the output device 202b, based on the received third information.

Figure 19:
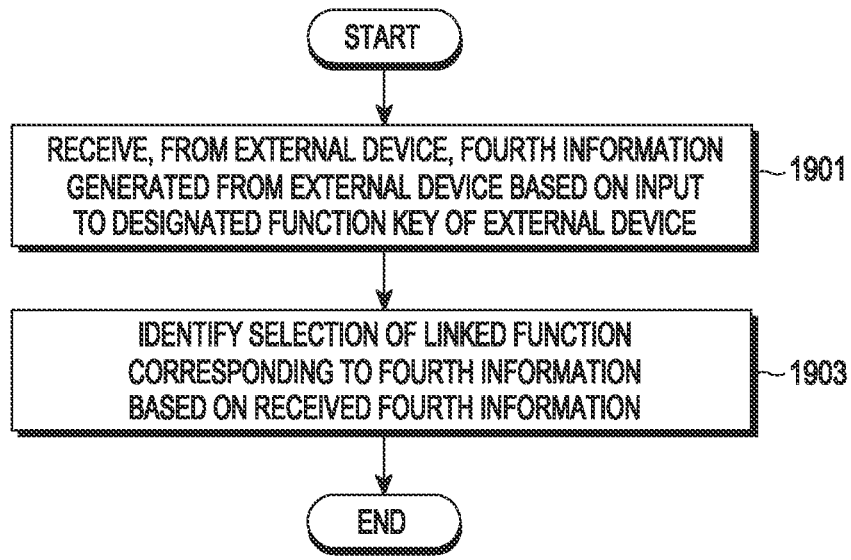
FIG. 19 is a flowchart illustrating an example operation method of an output device according to an embodiment.

FIG. 19 is a flowchart illustrating an example operation method of an output device according to an embodiment.

Referring to FIG. 19, in operation 1901, according to an embodiment, the output device 202b (e.g., the processor 120) may receive information from an external device (e.g., the input device 201b). For example, the output device 202b may receive, from the input device 201b, fourth information generated by the input device 201b based on the input to the designated function key 253b of the input device 201b.

In operation 1903, according to an embodiment, the output device 202b may identify selection of a specific linked function corresponding to the designated function key 253b based on the fourth information received from the input device 201b.

Figure 20:
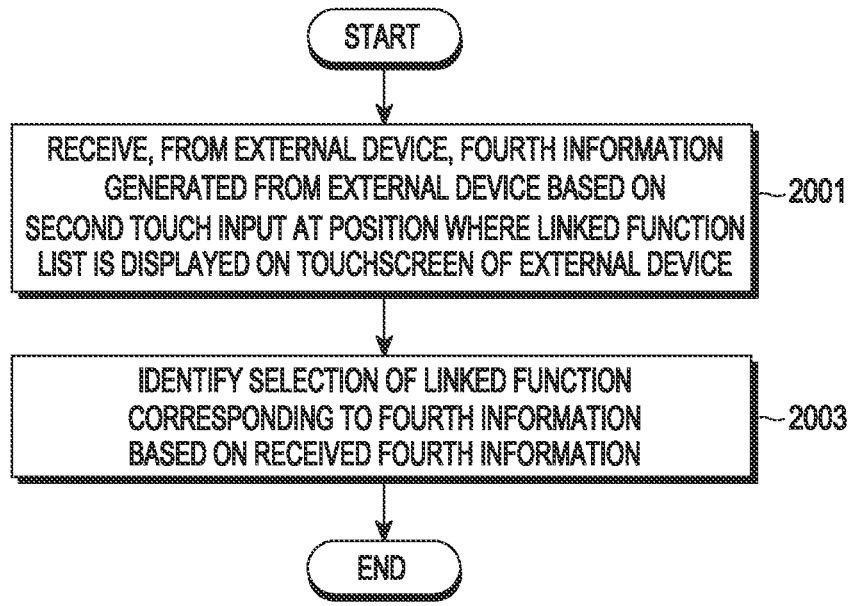
FIG. 20 is a flowchart illustrating an example operation method of an output device according to an embodiment.

FIG. 20 is a flowchart illustrating an example operation method of an output device according to an embodiment.

Referring to FIG. 20, in operation 2001, according to an embodiment, the output device 202b (e.g., the processor 120) may receive information from an external device (e.g., the input device 201b). For example, the output device 202b may receive, from the input device 201b, fourth information generated by the input device 201b based on the touch input (e.g., the second touch input) at the position where the linked function list is displayed on the touchscreen 256b of the input device 201b.

In operation 2003, according to an embodiment, the output device 202b may identify selection of the specific linked function corresponding to the touch input (e.g., second touch input) at the position where the linked function list is displayed on the touchscreen 256b of the input device 201b, based on the fourth information received from the input device 201b.

Figure 21:
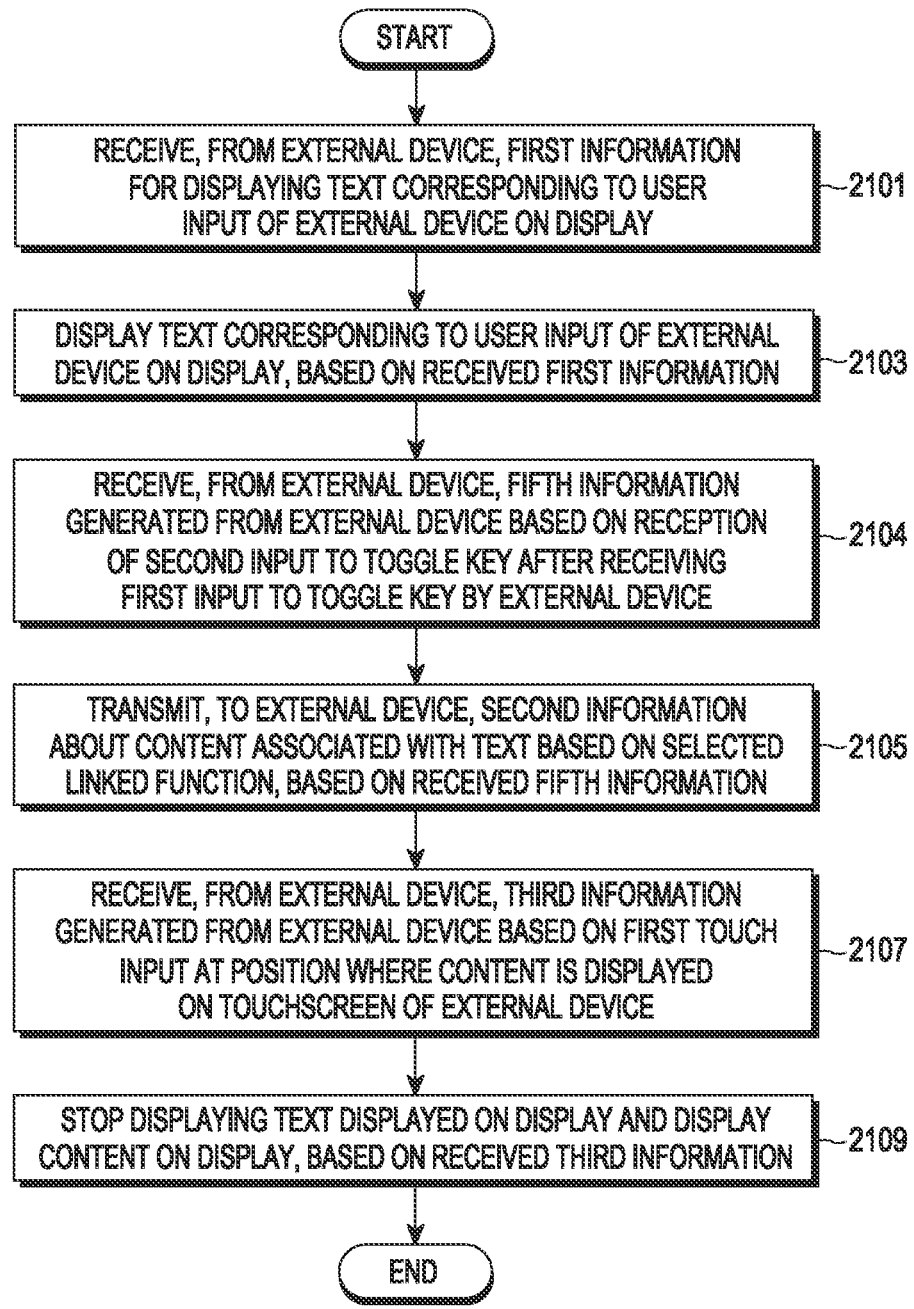
FIG. 21 is a flowchart illustrating an example operation method of an output device according to an embodiment.

FIG. 21 is a flowchart illustrating an example operation method of an output device according to an embodiment.

Referring to FIG. 21, according to an embodiment, in operation 2101, the output device 202b (e.g., the processor 120) may receive first information for displaying the text corresponding to a user input to the external device (e.g., the input device 201b) on the display 260b of the output device 202b, from the external device (e.g., the input device 201b).

In operation 2103, according to an embodiment, the output device 202b may display the text corresponding to the user input of the input device 201b on the display 260b of the output device 202b, based on the first information received from the input device 201b.

In operation 2104, according to an embodiment, the output device 202b may receive information from the input device 201b. For example, the output device 202b may receive, from the input device 201b, fifth information generated by the input device 201b, based on reception of the second input to the toggle key 251b after receiving the first input to the toggle key 251b by the input device 201b.

In operation 2105, according to an embodiment, the output device 202b may transmit information (e.g., second information) about the content associated with the text to the input device 201b, based on the selected linked function, based on the fifth information received from the input device 201b. The input device 201b may display the content associated with the text on the touchscreen 256b based on the second information received from the output device 202b.

In operation 2107, according to an embodiment, the output device 202b may receive, from the input device 201b, third information generated by the input device 201b based on the first touch input at the position where content is displayed on the touchscreen 256b of the input device 201b.

In operation 2109, according to an embodiment, the output device 202b may stop displaying the text displayed on the display 260b of the output device 202b or display the content associated with the text on the display 260b of the output device 202b, based on the received third information.

According to an embodiment, unlike in operation 2109, the output device 202b may keep displaying the text displayed on the display 260b of the output device 202b while displaying the content associated with the text on the display 260b of the output device 202b, based on the received third information.

Figure 22:
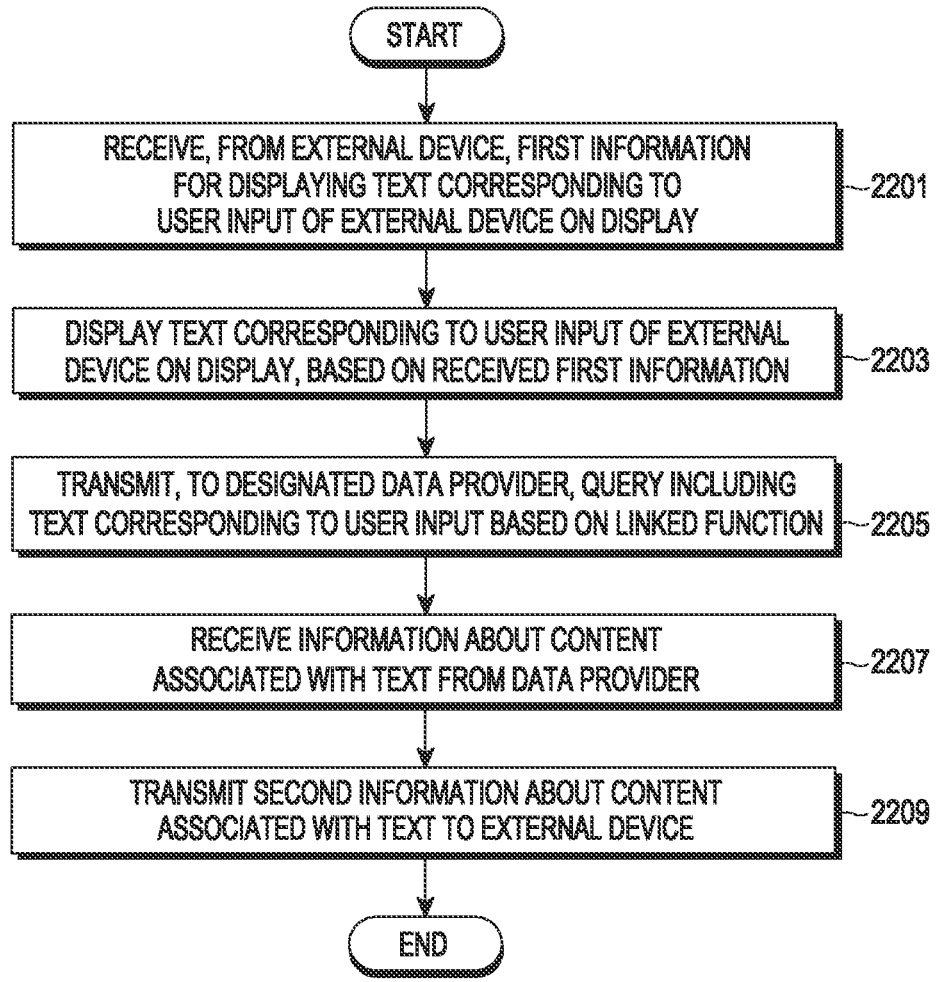
FIG. 22 is a flowchart illustrating an example operation method of an output device according to an embodiment.

FIG. 22 is a flowchart illustrating an example operation method of an output device according to an embodiment.

Referring to FIG. 22, according to an embodiment, in operation 2201, the output device 202b (e.g., the processor 120) may receive first information for displaying the text corresponding to a user input to the input device 201b on the display 260b of the output device 202b, from the input device 201b.

In operation 2203, the output device 202b may display the text corresponding to the user input of the input device 201b on the display 260b based on the received first information.

In operation 2205, according to an embodiment, the output device 202b may transmit a query including the text corresponding to the user input of the input device 201b to the data provider 203 designated based on the linked function. As described above, a specific application executed on the output device 202b and/or an external device independent from the output device 202b may be designated as the data provider 203, based on the selected linked function.

In operation 2207, according to an embodiment, the output device 202b may receive information about the content associated with the text from the data provider 203.

In operation 2209, according to an embodiment, the output device 202b may transmit the information (e.g., second information) about the content associated with the text to the input device 201b.

According to various example embodiments, an electronic device (e.g., the electronic device 201a) may include a display (e.g., the display 260a), a touchscreen (e.g., the touchscreen 256a), a keyboard-type input device (e.g., the keyboard-type input device 250a) including a plurality of keys, and a processor. (e.g., the processor 120). The processor may be configured to receive a first input to a designated toggle key (e.g., the toggle key 251a) included in the keyboard-type input device, receive a user input through the keyboard-type input device after receiving the first input to the toggle key, display text corresponding to the user input on each of the touchscreen and the display, display content associated with the text on the touchscreen based on a selected linked function, receive a first touch input at a position where the content is displayed on the touchscreen, and stop displaying the text displayed on the display and display the content on the display, based on the first touch input.

According to various example embodiments, the linked function may include a search function, a translation function, an image search function, an emoji function, a macro function, or a contact search function.

According to various example embodiments, the processor may be further configured to receive an input to a designated function key (e.g., the function key 253a) included in the keyboard-type input device and identify selection of the linked function corresponding to the designated function key, based on the input to the designated function key.

According to various example embodiments, the processor may be further configured to receive a second touch input at a position where a linked function list is displayed on the touchscreen and identify selection of the linked function corresponding to the second touch input, based on the second touch input.

According to various example embodiments, the processor may be configured to display, on the touchscreen, the content associated with the text based on the linked function, in response to reception of a second input to the toggle key after receiving the first input to the toggle key.

According to various example embodiments, the content associated with the text may be content provided by a designated data provider (e.g., the data provider 203) based on the linked function.

According to various example embodiments, the processor may be further configured to control a communication module (including, e.g., communication circuitry) of the electronic device to transmit, to the data provider, a query including the text corresponding to the user input and control the communication module to receive information about the content associated with the text from the data provider.

According to various example embodiments, an input device (e.g., the input device 201b) may include a communication module (e.g., the communication module 190) configured to perform communication with an output device (e.g., the output device 202b), a touchscreen (e.g., the touchscreen 256b), a keyboard-type input device (e.g., the keyboard-type input device 250b) including a plurality of keys, and a processor (e.g., the processor 120). The processor may be configured to receive a first input to a designated toggle key (e.g., the toggle key 251b) included in the keyboard-type input device, receive a user input through the keyboard-type input device after receiving the first input to the toggle key, display text corresponding to the user input on the touchscreen, control the communication module (including, e.g., communication circuitry) to transmit, to the output device, first information for displaying the text corresponding to the user input on a display of the output device, control the communication module to receive, from the output device, second information about content associated with the text, based on a selected linked function, display the content on the touchscreen, based on the received second information, receive a first touch input at a position where the content is displayed on the touchscreen, and control the communication module to transmit, to the output device, third information for stopping the display of the text displayed on the display of the output device and displaying the content on the display of the output device, based on the first touch input.

According to various example embodiments, the linked function may include a search function, a translation function, an image search function, an emoji function, a macro function, or a contact search function.

According to various example embodiments, the processor may be further configured to receive an input to a designated function key (e.g., the function key 253b) included in the keyboard-type input device, control the communication module to transmit, to the output device, fourth information for identifying selection of the linked function corresponding to the designated function key, based on the input to the designated function key, and control the communication module to receive, from the output device, fifth information for identifying selection of the linked function.

According to various example embodiments, the processor may be further configured to receive a second touch input at a position where a linked function list is displayed on the touchscreen, control the communication module to transmit, to the output device, fourth information for identifying selection of the linked function corresponding to the second touch input, based on the second touch input, and control the communication module to receive, from the output device, fifth information for identifying selection of the linked function.

According to various example embodiments, the processor may be configured to display, on the touchscreen, the content associated with the text based on the linked function, based on reception of a second input to the toggle key after receiving the first input to the toggle key.

According to various example embodiments, information about the content associated with the text may be content provided by a designated data provider (e.g., the data provider 203) based on the linked function.

According to various example embodiments, an output device (e.g., the output device 202b) may include at least one communication module (e.g., the communication module 190), a display (e.g., the display 260b), and a processor (e.g., the processor 120). The processor may be configured to control the at least one communication module to receive, from an input device (e.g., the input device 201b), first information for displaying text corresponding to a user input of the input device on the display, display the text corresponding to the user input of the input device on the display, based on the received first information, control the at least one communication module to transmit, to the input device, second information about content associated with the text, based on a selected linked function, control the at least one communication module to receive, from the input device, third information generated from the input device based on a first touch input at a position where the content is displayed on a touchscreen of the input device, and stop displaying the text displayed on the display and display the content on the display, based on the received third information.

According to various example embodiments, the linked function may include a search function, a translation function, an image search function, an emoji function, a macro function, or a contact search function.

According to various example embodiments, the processor may be further configured to control the at least one communication module to receive, from the input device, fourth information generated from the input device based on an input to a designated function key (e.g., the function key 253b) of the input device and identify selection of the linked function corresponding to the fourth information based on the received fourth information.

According to various example embodiments, the processor may be further configured to control the at least one communication module to receive, from the input device, fourth information generated from the input device based on a second touch input at a position where a linked function list is displayed on the touchscreen of the input device and identify selection of the linked function corresponding to the fourth information based on the received fourth information.

According to various example embodiments, the processor may be configured to control the at least one communication module to receive, from the input device, fifth information generated from the input device based on reception of a second input to the toggle key after receiving a first input to the toggle key (e.g., the toggle key 251b) and control the at least one communication module to transmit, to the input device, the second information about the content associated with the text based on the selected linked function based on the received fifth information.

According to various example embodiments, the content associated with the text may be content provided by a designated data provider (e.g., the data provider 203) based on the linked function.

According to various example embodiments, the processor may be further configured to control the at least one communication module to transmit, to the data provider, a query including the text corresponding to the user input of the input device and control the at least one communication module to receive information about the content associated with the text from the data provider.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and the data being temporarily stored in the storage medium.

A method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a first display;
a touchscreen second display different from the first display;
a keyboard-type input device including a plurality of keys;
at least one processor comprising processing circuitry; and
memory storing instructions,
wherein the instructions, when executed by the at least one processor individually or collectively, cause the electronic device to perform operations comprising:
receiving a first input to a designated toggle key included in the keyboard-type input device;
receiving a user input through the keyboard-type input device after receiving the first input to the toggle key;
displaying text corresponding to the user input on each of the touchscreen second display and the first display;
displaying content associated with the text on the touchscreen second display based on a selected linked function;
receiving a first touch input at a position where the content is displayed on the touchscreen second display; and
stopping displaying the text displayed on the first display and display the content on the first display, based on the first touch input.

2. The electronic device of claim 1, wherein the linked function includes a search function, a translation function, an image search function, an emoji function, a macro function, or a contact search function.

3. The electronic device of claim 1, wherein the instructions, when executed by the at least one processor individually or collectively, cause the electronic device to perform operations comprising:
receiving an input to a designated function key included in the keyboard-type input device; and
identifying selection of the linked function corresponding to the designated function key, based on the input to the designated function key.

4. The electronic device of claim 1, wherein the instructions, when executed by the at least one processor individually or collectively, cause the electronic device to perform operations comprising:
receiving a second touch input at a position where a linked function list is displayed on the touchscreen second display; and
identifying selection of the linked function corresponding to the second touch input, based on the second touch input.

5. The electronic device of claim 1, wherein the instructions, when executed by the at least one processor individually or collectively, cause the electronic device to perform operations comprising displaying, on the touchscreen second display, the content associated with the text based on the linked function, in response to reception of a second input to the toggle key after receiving the first input to the toggle key.

6. The electronic device of claim 1, wherein the content associated with the text is content provided by a designated data provider based on the linked function.

7. The electronic device of claim 6, wherein the instructions, when executed by the at least one processor individually or collectively, cause the electronic device to perform operations comprising:
transmitting, to the data provider, a query including the text corresponding to the user input; and
receiving information about the content associated with the text from the data provider.

8. An input device, comprising:
a communication module, including a communication circuit, configured to perform communication with an external output device;
a touchscreen display;
a keyboard-type input device including a plurality of keys;
at least one processor comprising processing circuitry; and memory storing instructions,
wherein the instructions, when executed by the at least one processor individually or collectively, cause the input device to perform operations comprising:
receiving a first input to a designated toggle key included in the keyboard-type input device;
receiving a user input through the keyboard-type input device after receiving the first input to the toggle key;
displaying text corresponding to the user input on the touchscreen display;
transmitting, through the communication module, to the output device, first information for displaying the text corresponding to the user input on a display of the output device;
receiving, through the communication module, from the output device, second information about content associated with the text, based on a selected linked function;
displaying the content on the touchscreen display, based on the received second information;
receiving a first touch input at a position where the content is displayed on the touchscreen display; and
transmitting, through the communication module, to the output device, third information for stopping the display of the text displayed on the display of the output device and displaying the content on the display of the output device, based on the first touch input.

9. The input device of claim 8, wherein the linked function includes a search function, a translation function, an image search function, an emoji function, a macro function, or a contact search function.

10. The input device of claim 8, wherein the instructions, when executed by the at least one processor individually or collectively, cause the input device to perform operations comprising:
receiving an input to a designated function key included in the keyboard-type input device;
transmitting, through the communication module, to the output device, fourth information for identifying selection of the linked function corresponding to the designated function key, based on the input to the designated function key; and
receiving, through the communication module, from the output device, fifth information for identifying selection of the linked function.

11. The input device of claim 8, wherein the instructions, when executed by the at least one processor individually or collectively, cause the input device to perform operations comprising:
receiving a second touch input at a position where a linked function list is displayed on the touchscreen display;
transmitting, through the communication module, to the output device, fourth information for identifying selection of the linked function corresponding to the second touch input, based on the second touch input; and
receiving, through the communication module, from the output device, fifth information for identifying selection of the linked function.

12. The input device of claim 8, wherein the instructions, when executed by the at least one processor individually or collectively, cause the input device to perform operations comprising displaying, on the touchscreen display, the content associated with the text based on the linked function, in response to reception of a second input to the toggle key after receiving the first input to the toggle key.

13. The input device of claim 8, wherein information about the content associated with the text is content provided by a designated data provider based on the linked function.

14. An output device, comprising:
at least one communication module, including a communication circuit;
a display;
at least one processor comprising processing circuitry;
memory storing instructions,
wherein the instructions, when executed by the at least one processor individually or collectively cause the output device to perform operations comprising:
receiving, through the at least one communication module, from an input device, first information for displaying text corresponding to text displayed on a touchscreen display of the input device;
displaying, on the display, the text corresponding to the text displayed on the touchscreen display, based on the received first information;
transmitting, through the at least one communication module, to the input device, second information about content associated with the text, based on a selected linked function;
receiving, through the at least one communication module, from the input device, third information generated from the input device based on a first touch input at a position where the content is displayed on the touchscreen display of the input device; and
stopping display of the text displayed on the display and displaying the content on the display, based on the received third information.

15. The output device of claim 14, wherein the linked function includes a search function, a translation function, an image search function, an emoji function, a macro function, or a contact search function.

* * * * *